(12) United States Patent
Groves et al.

(10) Patent No.: US 7,599,990 B1
(45) Date of Patent: Oct. 6, 2009

(54) BUDDY LIST-BASED SHARING OF ELECTRONIC CONTENT

(75) Inventors: Blake Groves, Austin, TX (US); W. Karl Renner, Great Falls, VA (US)

(73) Assignee: AOL LLC, Dulles, VA (US)

( * ) Notice: Subject to any disclaimer, the term of this patent is extended or adjusted under 35 U.S.C. 154(b) by 0 days.

(21) Appl. No.: 12/131,882

(22) Filed: Jun. 2, 2008

Related U.S. Application Data

(63) Continuation of application No. 10/827,420, filed on Apr. 20, 2004, now Pat. No. 7,383,308.

(60) Provisional application No. 60/543,392, filed on Feb. 11, 2004.

(51) Int. Cl.
G06F 15/16 (2006.01)

(52) U.S. Cl. .......... 709/204; 709/226; 709/248; 715/753

(58) Field of Classification Search ............ 709/204, 709/226, 248
See application file for complete search history.

(56) References Cited

U.S. PATENT DOCUMENTS

| | | | |
|---|---|---|---|
| 6,973,618 B2 | 12/2005 | Shaughnessy et al. | |
| 7,080,139 B1 * | 7/2006 | Briggs et al. | 709/224 |
| 7,120,672 B1 * | 10/2006 | Szeto et al. | 709/206 |
| 7,146,404 B2 | 12/2006 | Kay et al. | |
| 7,243,130 B2 * | 7/2007 | Horvitz et al. | 709/207 |
| 7,284,033 B2 | 10/2007 | Jhanji | |
| 7,299,257 B2 | 11/2007 | Boyer et al. | |
| 7,383,308 B1 * | 6/2008 | Groves et al. | 709/206 |
| 7,386,798 B1 * | 6/2008 | Heikes et al. | 715/752 |
| 2002/0023132 A1 | 2/2002 | Tornabene et al. | |
| 2002/0065894 A1 * | 5/2002 | Dalal et al. | 709/206 |
| 2002/0198946 A1 | 12/2002 | Wang et al. | |
| 2003/0046355 A1 * | 3/2003 | Rosenberg et al. | 709/206 |
| 2004/0044736 A1 | 3/2004 | Austin-Lane et al. | |
| 2004/0073615 A1 | 4/2004 | Darling | |
| 2004/0078445 A1 | 4/2004 | Malik | |
| 2004/0148347 A1 | 7/2004 | Appelman et al. | |
| 2005/0055416 A1 | 3/2005 | Heikes et al. | |
| 2006/0005133 A1 | 1/2006 | Lyle et al. | |
| 2007/0168447 A1 | 7/2007 | Chen et al. | |

OTHER PUBLICATIONS

Outlook 2000 Tips and Tricks; Kyle Hommes; "Use Outlook to Track Long-Distance Calls"; reprinted from http://www.microsoft.com/office/previous/2000/tips/outlook.asp printed on Feb. 2, 2004 (17 pages).

* cited by examiner

*Primary Examiner*—Michael Won
(74) *Attorney, Agent, or Firm*—Fish & Richardson P.C.

(57) ABSTRACT

Instant messaging (IM) entities may be invited to an electronic calendar event using an instant message. Selecting the IM entities as invitees to the event may include dragging and dropping names of the IM entities from a buddy list of an IM application to an event from an electronic calendar application, or vice versa. A method of inviting an entity to a calendar event includes providing a calendar event from a calendar application and recognizing, by the calendar application, an IM entity as an invitee to the event.

32 Claims, 30 Drawing Sheets

BUDDY LIST-BASED SHARING OF ELECTRONIC CONTENT

CROSS REFERENCE TO RELATED APPLICATIONS

This application claims the benefit of priority to and is a continuation of U.S. patent application Ser. No. 10/827,420, filed Apr. 20, 2004, and titled "Buddy List-Based Sharing of Electronic Content," which claims the benefit of priority to U.S. Provisional Patent Application No. 60/543,392, filed Feb. 11, 2004, and titled "Buddy List-based Calendaring." Both prior applications are incorporated herein by reference in their entirety.

TECHNICAL FIELD

This document relates to sharing electronic content with an entity using electronic messages.

BACKGROUND

Scheduling an electronic calendar event may involve proposing a specific date and time to one or more potential event participants (i.e., inviting), and modifying the date and time of the event based on the availability of those participants. The participants typically communicate to determine a time when they are available to attend the event. Electronic mail ("e-mail") may be the communication medium used to schedule such an event.

SUMMARY

In one general aspect, a method for sharing electronic content includes enabling access to a buddy list user interface that makes perceivable user-identified online identities and real time presence information for at least some of those online identities. Based on user manipulation of the buddy list user interface, designation of several online identities that constitute a subset of the online identities for whom presence is indicated within the buddy list is enabled. An indication of content to be shared with each of the online identities designated is received from the user. Separate communications are established with each of the online identities designated by the user. Content is communicated on behalf of the user independently to each of the online identities designated by the user.

In another general aspect, a computer system for sharing electronic content includes an access module configured to enable access to a buddy list user interface that makes perceivable user-identified online identities and real time presence information for at least some of those online identities. The computer system also includes a user designation module configured to enable designation of several online identities that constitute a subset of the online identities for whom presence is indicated within the buddy list based on user manipulation of the buddy list user interface and a content selection module configured to receive from the user an indication of content to be shared with each of the designated online identities. The computer system also includes a communications establishing module configured to establish separate communications with each of the online identities designated by the user and a communications module configured to communicate content on behalf of the user independently to each of the online identities designated by the user.

In another general aspect, an apparatus for sharing electronic content includes access means for enabling access to a buddy list user interface that makes perceivable user-identified online identities real time presence information for at least some of those online identities. The apparatus also includes user designation means for enabling designation of several online identities that constitute a subset of the online identities for whom presence is indicated within the buddy list, based on user manipulation of the buddy list interface, and content selection means receiving from the user an indication of content to be shared with each of the designated online identities. The apparatus also includes communications establishing means for establishing separate communications with each of the online identities designated by the user and communications means for communicating content on behalf of the user independently to each of the online identities designated by the user.

Implementations may include one or more of the following features. For example, communicating independently may include establishing a separate instant messaging session between the user and each of the online participants. Responses received from each online participant may not be viewable by the other online participants. The content specified by the user may be made available to each of the designated online participants.

Designating may include selecting particular online identities using a mouse pointer. Designation of several online identities may be a manual process performed by a user. The manual process may involve manual selection of each online identity individually, using a pointing device.

The content to be shared may be a calendar event. The calendar event may be dropped onto a representation of the designated online identities in the buddy list to inspire communication of the calendar event, or a corresponding invitation, to each of the designated online identifies separately. A representation of the designated online identities in the buddy list may be dropped onto the calendar event to inspire communication of the calendar event, or a corresponding invitation, to each of the designated online identifies separately.

The content to be shared may be dropped onto a representation of the designated online identities in the buddy list to inspire communication of the content to each of the designated online identities separately.

A representation of the designated online identities in the buddy list may be dropped onto the content to be shared to inspire communication of the content to each of the designated online identities separately.

Communicating the content to each of the online identities designated by the user may include determining which of the designated online identities are presently online. The content may be communicated to the designated online identities that are presently online using instant messaging, and the content may be communicated to the designated online identities that are not presently online using a communications program other than instant messaging. Electronic mail may be the communications program used to communicate the content to the designated online identities that are not presently online. Instant messages may be used to communicate the content, wherein delivery of the instant messages is delayed until the designated online identities that are not presently online to the designated online identities that are not presently online are again online. The user may be provided with options to communicate the content to the designated online identities that are not presently online using a communications program other than instant messaging.

Communicating the content to each of the designated online identities may include resolving a cascaded delivery rule for each of the designated online identities to choose a delivery mechanism for communicating the content to each of the designated online identities and using each of the chosen delivery mechanisms to communicate the content to the corresponding designated online identity. A delivery rule may be specified for each of the designated online identities by each of the designated online identities. The user may specify a delivery rule for each of the designated online identities.

Receiving the indication of the content to be shared with each of the designated online identities may occur before designation of the online identities. Receiving the indication of the content to be shared with each of the designated online identities may occur after designation of the online identities.

In another general aspect, a method of sharing electronic content includes enabling user generation of application-specific, sharable electronic content. User selection of a first instant messaging entity and a second instant messaging entity is received. A single message that includes the application-specific, shareable electronic content and that is to be associated with the first instant messaging entity and the second instant messaging entity is generated. The user is enabled to send the message using an instant messaging platform that is sent concurrently to the first instant messaging entity and the second instant messaging entity. Responses received from the first and the second instant messaging entities are mediated.

Implementations may include one or more of the following features. For example, the electronic content may be a calendar event from a calendar application, and recognizing the first instant messaging entity and the second instant messaging entity may include recognizing the first instant messaging entity and the second instant messaging entity as invitees to the calendar event.

An invitation to the calendar event for the first instant messaging entity may be generated by the calendar application. The message may be an invitation to the calendar event. Enabling the user to send the message may include enabling the user to send the invitation from the calendar application to an instant messaging server. Enabling the user to send the message may include enabling the user to send the invitation to a communications application and allowing the communications application to deliver the invitation to the first instant messaging entity and the second instant messaging entity. The communications application may be an instant messaging application.

The first instant messaging entity and the second instant messaging entity to the calendar event using instant messages may be automatically invited in response to recognizing the first instant messaging entity and the second instant messaging entity as invitees. Automatically inviting may include sending an invitation to the calendar event to the first instant messaging entity and the second instant messaging entity using instant messages.

Recognizing the first instant messaging entity and the second instant messaging entity as invitees may be performed in response to a user dragging the calendar event from the calendar application to a representation of the first instant messaging entity and a representation of the second instant messaging entity. Recognizing the first instant messaging entity and the second instant messaging entity as invitees may be performed in response to a user entering the first instant messaging entity and the second instant messaging entity into the calendar event. Recognizing the first instant messaging entity and the second instant messaging entity as invitees may be performed in response to a user selecting the first instant messaging entity and the second instant messaging entity from a list of potential instant messaging entities, the list being generated by the calendar application.

Recognizing the first instant messaging entity and the second instant messaging entity as invitees may be performed in response to a user dragging and dropping a block of time from the calendar application to a representation of the first instant messaging entity and a representation of the second instant messaging entity. Enabling user generation of electronic content may include providing the calendar event, in which the user may generate electronic content, the calendar event being provided in response to the dragging and dropping, with the first instant messaging entity and the second instant messaging entity as invitees.

Recognizing the first instant messaging entity and the second instant messaging entity as invitees may be performed in response to a user selecting a feature associated with the first instant messaging entity and the second instant messaging entity, the feature automatically inviting the first instant messaging entity and the second instant messaging entity to the calendar event. Recognizing the first instant messaging entity and the second instant messaging entity occurs before enabling user generation of the electronic content.

Recognizing the first instant messaging entity and the second instant messaging entity may be performed in response to the user dragging a representation of the first instant messaging entity and a representation of the second instant messaging entity to a representation of the electronic content. Recognizing the first instant messaging entity and the second instant messaging entity may be performed in response to the user dragging a representation of the electronic content to a representation of the first instant messaging entity and a representation of the second instant messaging entity.

The first instant messaging entity or the second instant messaging entity may represent an individual user of an instant messaging system. The first instant messaging entity or the second instant messaging entity may represent multiple users of an instant messaging system. The first instant messaging entity or the second instant messaging entity may be listed in a buddy list. The message may be an instant message that may be sent to multiple instant messaging entities at substantially the same time.

The electronic content may be modified as indicated in the response to produce modified electronic content. A new message including the modified electronic content may be generated, the new message being associated with the first instant messaging entity and the second instant messaging entity. The user may be enabled to send the new message as an instant message to the first instant messaging entity and the second instant messaging entity using the application.

In another general aspect, a method of sharing electronic content includes enabling access to user designation of contacts for whom presence is maintained. User selection of one or more of the contacts is enabled, and user selection of a first contact and a second contact from the contacts is recognized. An electronic message associated electronically with the first contact and the second contact as recipients is accessed. The electronic message is sent to each of the first contact and the second contact using an instant messaging system.

Implementations may include one or more of the following features. For example, sending the electronic message may be in response to a single user instruction. Enabling user description, enabling user selection, recognizing user selection, accessing the electronic message, and sending the electronic message may be each performed by an instant messaging application. The electronic message may include an invitation to a calendar event. Accessing the electronic message may include accessing the invitation, and sending the electronic message may include sending the invitation.

In another general aspect, an apparatus comprising a computer readable medium having instructions stored thereon that when executed by a machine result in at least enabling access to user designation of contacts for whom presence is maintained and enabling user selection of one or more of the contacts. User selection of a first contact and a second contact from the contacts is recognized. An electronic message associated electronically with the first contact and the second contact as recipients is accessed. The electronic message is sent to each of the first contact and the second contact using an instant messaging system.

In another general aspect, an apparatus comprising a computer readable medium having instructions stored thereon that when executed by a machine result in at least enabling user generation by an application of electronic content to be shared with at least a first recipient and a second recipient using an instant messaging system. User selection of a first instant messaging entity as the first recipient and a second instant messaging entity as the second recipient is recognized by the application. A message including the electronic content is generated, the message being associated with the first instant messaging entity and the second instant messaging entity. The user is enabled to send the message as an instant message that is sent concurrently to the first instant messaging entity and the second instant messaging entity using the application. A response to the message is received from the first instant messaging entity that is not sent to the second instant messaging entity or from the second instant messaging entity that is not sent to the first instant messaging entity.

The details of one or more implementations are set forth in the accompanying drawings and the description below. Other features will be apparent from the description and drawings, and from the claims.

DETAILED DESCRIPTION

Figure 1:
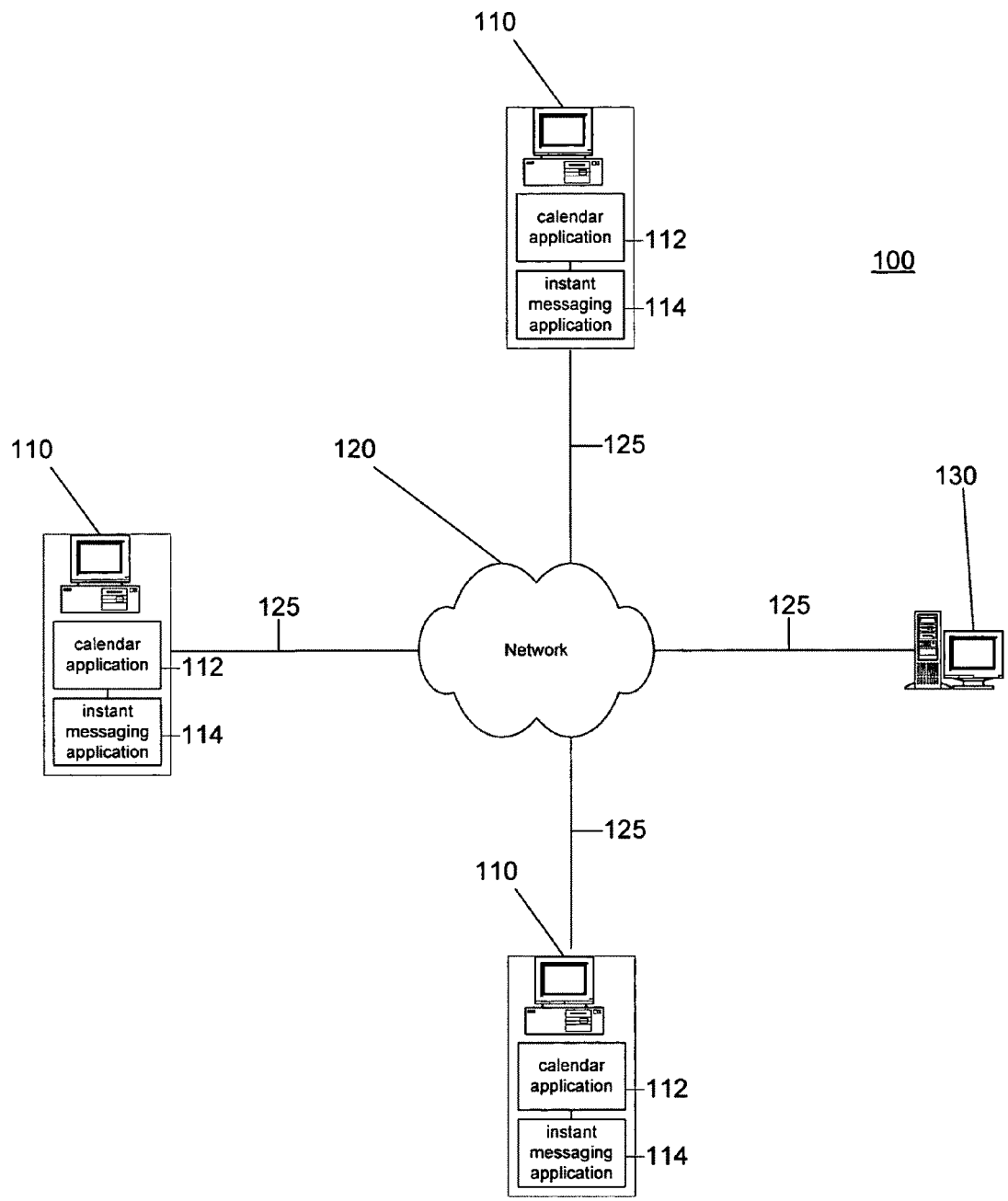
FIG. 1 is a block diagram of an exemplary electronic communication system.

Scheduling an event may demand the attention of all the people that are to attend the event. Each person that is to attend the event may need to determine his or her availability to attend the event and, if necessary, determine and communicate changes that need to be made to the event such that attendance is possible. Various types of communication may be used to invite the proposed attendees (i.e., the invitees) to the event, including e-mail. Another type of communication that may be used is an instant messaging (IM) system. The instant messaging system may automatically display the invitation on the screens of the invitees, immediately bringing the invitation to the attention of the invitees. Use of an IM system may allow an invitor to receive prompt responses to their invitation, while providing some level of assurance to the invitor that the invitee perceives their invitation without undue delay.

One implementation involves scheduling an event among a set of people using a combination of a calendar application and an IM system. The calendar application enables the storage, creation, and modification of events that a person is scheduled to attend. The calendar application also displays pending but unconfirmed events for review. The IM system may be used to send invitations to a proposed event, to suggest changes to the proposed event, and to inform invitees to the proposed event of changes to the proposed event.

In the above implementation, the person that originally proposed the event may have the names of one or more invitees stored in a buddy list, and thus may leverage the buddy list in selecting invitees and invoking calendar invitations. For example, the person originally scheduling the event may drag and drop a representation of a calendar event from the calendar application over a name or group of names in the buddy list, such that identification and contact information for the buddy list invitees may be added to or referenced by the calendar event and an instant message and/or e-mail message invitation or an alert may be inspired from the invitor to the invitee(s). Similarly, a name or group of names from the buddy list may be dragged and dropped over a representation of a calendar event from the calendar application. As another example, a blank period of time from the calendar application also may be dragged and dropped over a name or group of names in the buddy list to select the name or group of names as invitees to an unspecified event that will occur during the blank period of time. Likewise, a name or group of names from the buddy list also may be dragged and dropped over a blank period of time to create a new event during the blank period of time with the name or group of names as invitees to the event. As yet another example, the names of the people to be invited to the event may be typed or chosen from a list in the calendar application.

More particularly, in the above implementation, after the particular users of the IM system have been selected as invitees to the event, an invitation is sent to the selected users. The invitation may include a description of the event with a proposed time and date for the event. The communication of this invitation may be used to inspire creation of a corresponding calendar event entry in the calendar application for each of the invitees and to inspire an alert regarding conflicting calendar entries for the invitee.

An invitee may suggest a change to the proposed event, for example, when a conflict exists between the proposed event and another event stored within the calendar application for the invitee. The invitation to the proposed event may include a form that the invitees may use to request changes in the proposed event, and the form may propagate to the other invitees. Such requested changes may be approved by the user that originally proposed the event before they are propagated to the invitees. Once propagated, changes to the event may be automatically entered into the calendar application for all the invitees, and/or notifications may be sent to each invitee of proposed changes to enable their confirmation of availability/acceptance or alternatively their proposal for further modification to the event.

By receiving invitations over the IM system, the invitees may be notified without delay of invitations, enabling them to respond immediately. Moreover, invitees may promptly communicate and resolve conflicts.

Furthermore, by sending invitations over the IM system, the invitor may provide notification of an event without delay. Thus, invitors are provided a convenient, simple, and quick manner to inspire creation of an event with selected invitee(s), as well as a convenient manner of selecting the invitees. For example, to inspire creation of an event, an invitor may conveniently copy a selected time slot(s) and paste using a command, such as, for example, <control><c>, the copied time slot(s) to one or more buddies, or other contacts. Invitee(s) may be selected, for example, by pasting the copied time slot on a buddy (or other invitee), by preselecting one or more buddies using, for example, a left-click on a mouse for a single buddy or <shift> click for multiple buddies and pasting the copied time slot(s) onto the selected buddy(ies). Dragging and dropping also may be used in lieu of, or in addition to copying and pasting. Dragging a time slot or event over a buddy also may automatically select (e.g., highlight) that buddy. Invitees may be selected for an existing calendar event in an analogous manner to selecting invitees to a newly inspired event, for example, by copying/pasting or dragging/dropping the existing event.

As suggested above, enabling selection of the invitees and the event itself quickly by dragging and dropping between an electronic calendar and a buddy list may save time in creating/updating an event. Dragging and dropping may automatically specify certain details of the event, eliminating the need to enter those details, and thereby saving time. For example, simply dragging a time slot to a group of buddies (or other contacts) automatically specified the time, day, duration, and multiple invitees for an event.

Referring to FIG. 1, an implementation of a networked computing environment 100 supports communications between computer users. The networked computing environment 100 facilitates communication for scheduling an event among multiple users of the networked computing environment 100. The networked computing environment 100 is used to distribute messages that aid in the scheduling and modification of the event.

Users of the networked computing environment 100 are distributed geographically and communicate using client systems 110. The client systems 110 are shown including a calendar application 112 and an IM application 114, although other client systems that do not include applications 112 or 114 may be used. A network 120 interconnects the client systems 110. The client systems 110 are connected to network 120 through various communication media 125, such as a modem connected to a telephone line (using, for example, serial line internet protocol (SLIP) or point-to-point protocol (PPP)) or a direct network connection (using, for example, transmission control protocol/internet protocol (TCP/IP)). A host server 130 also may be connected to the network 120 and may be used to facilitate some direct or indirect communications between the client systems 110.

Each of the client systems 110 may operate the calendar application 112 that enables a user to schedule events for attendance by multiple users of the networked computing environment 100. The client system 110 also may operate the IM 114 application that allows a user of the client system 110 to communicate with the other users of the networked computing environment 100. Each instance of the IM application 114 may have an associated buddy list that includes the users of the IM system that may be invited to an event. A user of the IM application 114 may create a calendar event using the calendar application 112 and then invite other users to the event using the IM application 114. The calendar application 112 may facilitate specification of the details of the event, such as a date and a time for the event, while the IM application 114 may facilitate selection of a set of users to be invited to the event and invitation of the users to the event.

Figure 2:
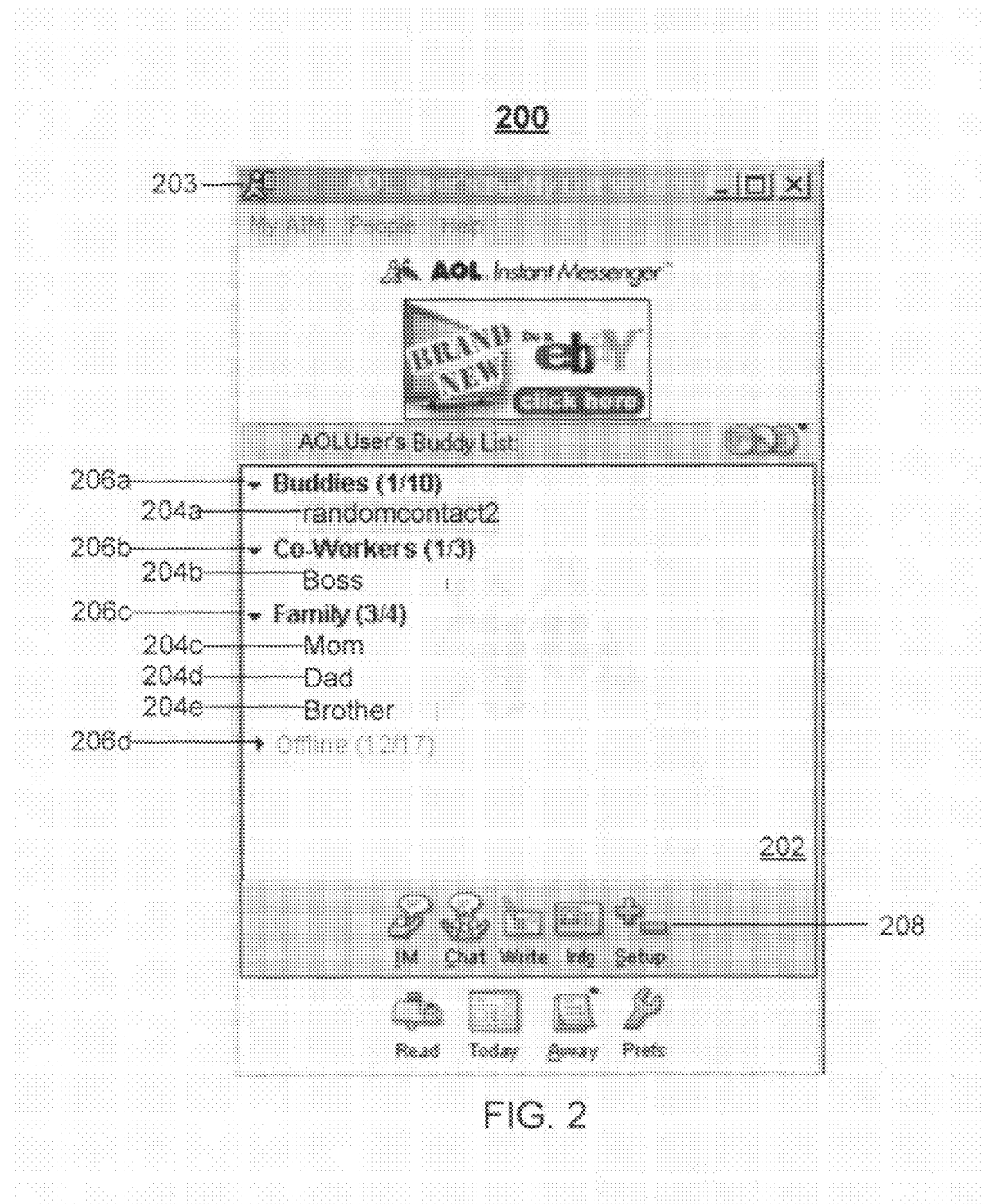
FIG. 2 is an illustration of an exemplary interface for displaying a buddy list for an instant messaging system.

Referring to FIG. 2, one implementation of a buddy list interface 200 may be used with one or more of the systems described herein to display, for a given user, identifiers (e.g., screen names) for other users whom they have selected for presence monitoring. The other users that have been selected for presence monitoring are logically grouped to form a buddy list for the given user. The buddy list interface 200 enables designation by the given user of others to invite to the proposed calendar event through selection of their identifiers or screen names using the given user's buddy list.

The buddy list interface 200 contains a text box 202 that contains the buddy list for the given user, who is identified in the title bar 203 by a screen name "AOL User." The buddy list includes multiple screen names. The buddy list in the buddy list interface 200 includes the screen name 204a, "randomcontact2"; the screen name 204b, "Boss"; the screen name 204c, "Mom"; the screen name 204d, "Dad"; and the screen name 204e, "Brother."

The buddy list in the buddy list interface 200 separates the constituent screen names 204a-204e into multiple buddy groups 206a-d. Specifically, the buddy list includes a buddy group 206a, "Buddies"; a buddy group 206b, "Co-Workers"; a buddy group 206c, "Family"; and a buddy group 206d, "Offline," that includes the screen names in the buddy list that are not connected to the IM system at any given instant in time. The screen name 204a appears below the heading for the buddy group 206a because the screen name 204a has been placed in the buddy group 206a and the corresponding user (randomcontact2) is logged in to the IM system. The heading for each of the buddy groups 206a-d indicates the total number of buddies in the group, as well as the number of buddies who are included in the group who presently are logged into the IM system-those who are "present." For example, one out of the ten members of the buddy group 206a is logged in to the IN system. The buddy list interface 200 contains a "Setup" button 208 that, when selected, enables the user to modify screen names included within the displayed buddy list.

Figure 3:
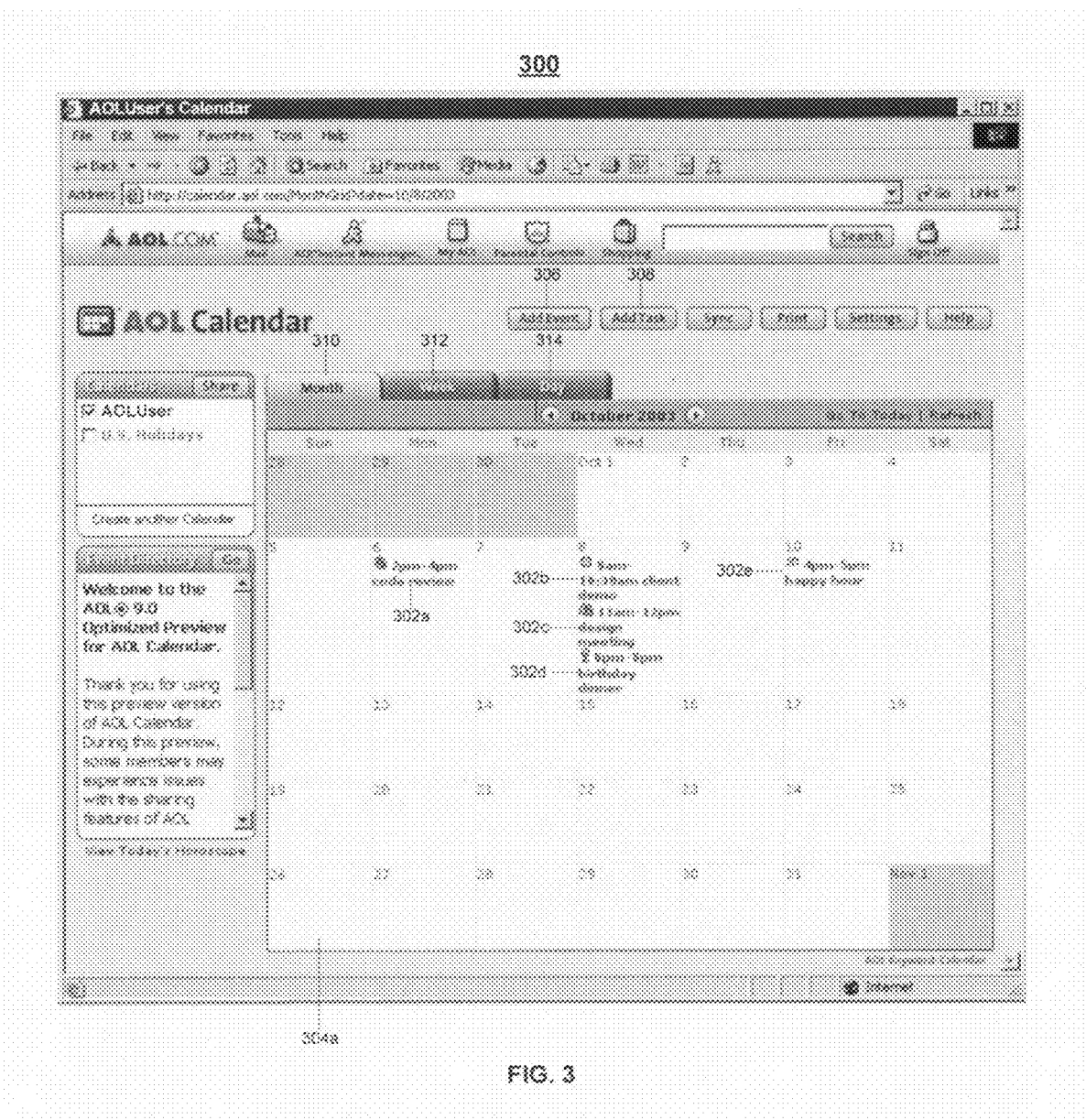
FIGS. 3-5 are illustrations of exemplary interfaces for displaying events in a calendar application by month, day, and week, respectively.

Referring to FIG. 3, one implementation of an electronic calendar interface 300 for use with one or more of the systems described herein displays electronic calendar events from a calendar of a given user for a selected month. The electronic calendar interface 300 includes multiple events 302a-e scheduled occur during the displayed month. For example, the electronic calendar interface 300 displays an event 302a titled "code review," an event 302b titled "client demo," an event 302c titled "design meeting," an event 302d titled "birthday dinner," and an event 302e titled "happy hour." The location of each of the events 302a-e within the electronic calendar interface 300 indicates the day on which the event 302a-e occurs. For example, the event 302a occurs on the sixth day of the displayed month. The electronic calendar interface 300 also includes blank periods 304a during which no events are scheduled. The blank periods 304a represent a full day during which no events occur.

Events may be added to the month currently displayed by the electronic calendar interface 300 through the use of an interface displayed as a result of selecting an "Add Event"

button 306 or an "Add Task" 308. Selecting the "Add Event" button 306 causes an interface to be displayed for specifying an event that is to be added to the user's calendar. Selecting the "Add Task" button 308 causes an interface to be displayed for specifying a particular type of event, that is, a task, that is to be added to the user's calendar.

The electronic calendar interface 300 also includes tabs 310-314 that may be used to select the desired view. A month tab 310 has been selected, as evidenced by the highlighted appearance of the tab, so the events occurring during a single month are displayed. Selecting a week tab 312 causes the electronic calendar interface 300 to display only the events occurring during a selected week, as described with reference to FIG. 4. Similarly, selecting a day tab 314 causes the electronic calendar interface 300 to display only the events occurring on a selected day, as described with reference to FIG. 5.

Figure 4:
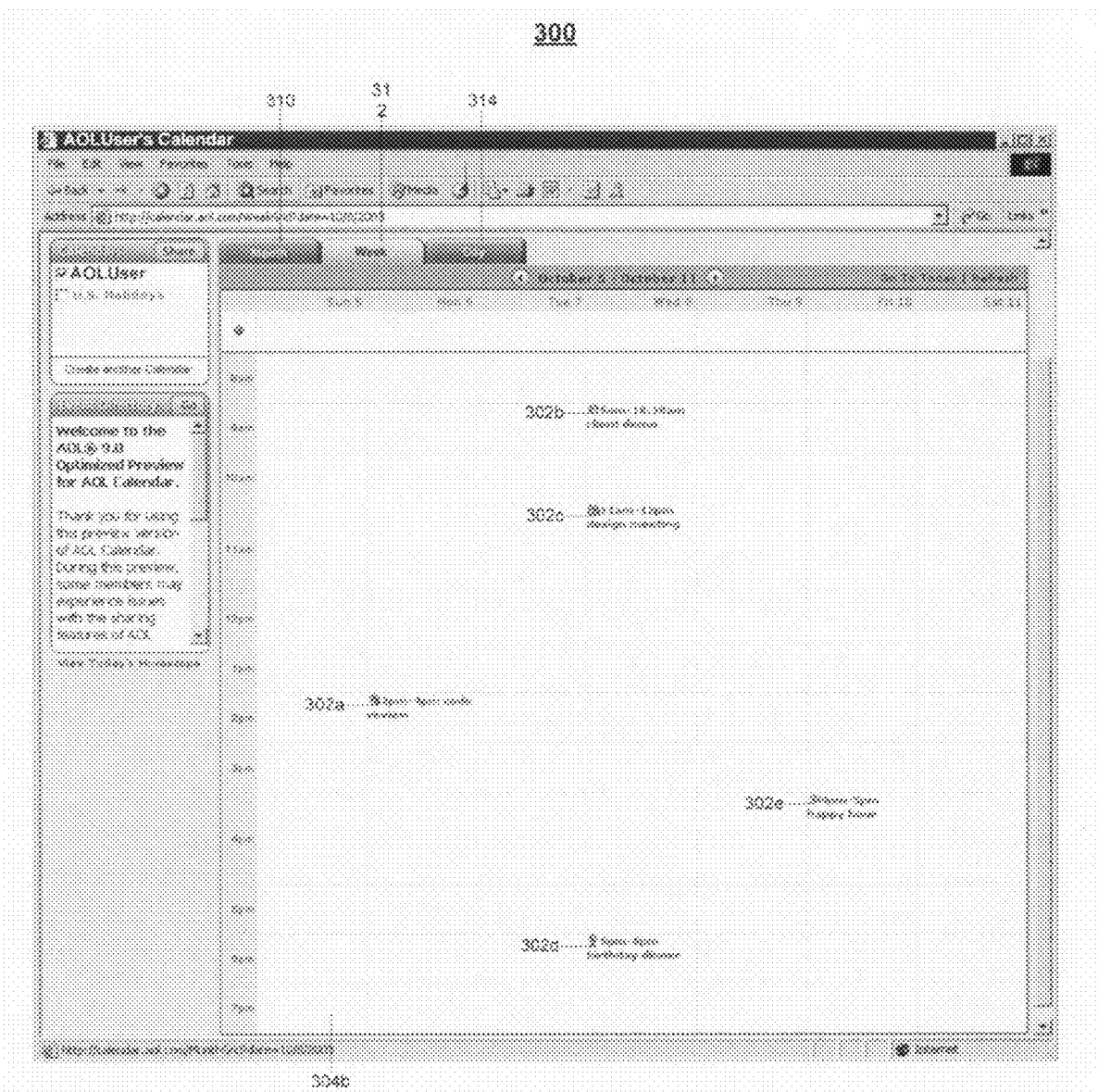

Referring to FIG. 4, the week tab 312 on the electronic calendar interface 300 has been selected, as evidenced by the highlighted appearance of the tab 312. Consequently, the events that occur during a selected week are displayed in FIG. 4. Because the week of Oct. 5, 2003 is selected for presentation in the "week" view of FIG. 4, and because the events 302a-e occur during the week of Oct. 5, 2003, the events 302a-e are displayed on the electronic calendar interface 300. The location and size of each of the events 302a-e within the electronic calendar interface 300 indicate the date, time, and duration of the event. For example, the event 302e occurs on the tenth day of the month, which is a Friday, from 4 PM to 5 PM. The electronic calendar interface 300 also includes blank periods 304b during which no events are scheduled. The blank periods 304b represent hours within the displayed week during which no events are scheduled to occur. The tabs 310-314 remain available to specify the desired view.

Figure 5:
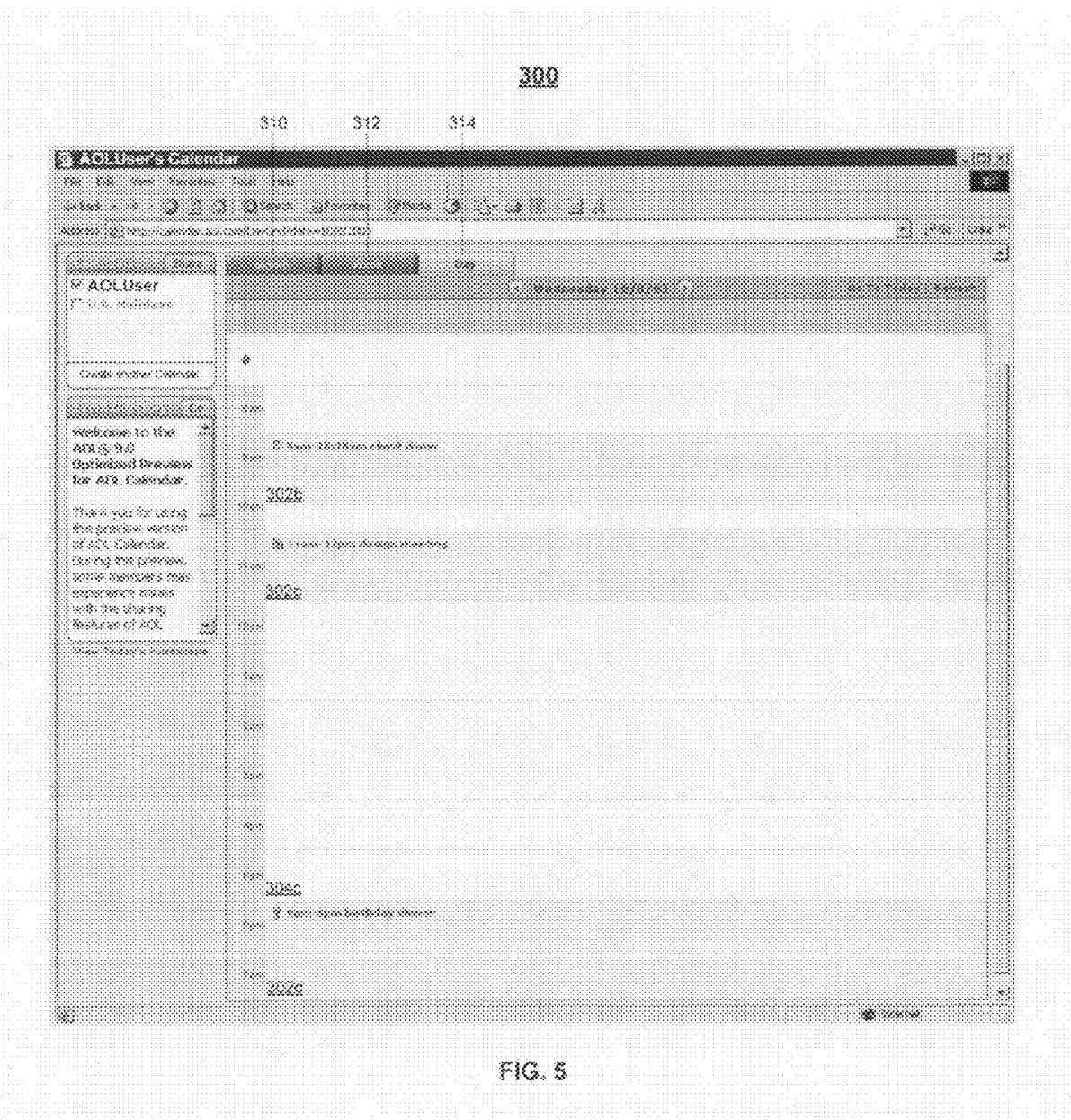

Referring to FIG. 5, the day tab 314 on the electronic calendar interface 300 has been selected, as evidenced by the highlighted appearance of the tab 314. Consequently, the events that occur during a selected day are displayed in FIG. 5. Because the day of Oct. 8, 2003 is selected for presentation in the "day" view of FIG. 5, and because the events 302b-d occur during the day of Oct. 8, 2003, the events 302b-d are displayed on the electronic calendar interface 300. The location and size of each of the events 302b-d within the electronic calendar interface indicate the time and duration of the event. For example, the event 302d occurs between 6 PM and 8 PM on the displayed day. The electronic calendar interface 300 also includes blank periods 304c during which no events are scheduled. The blank periods 304c represent hours within the displayed day during which no events are scheduled to occur. The tabs 310-314 remain available to specify the desired view.

Figure 6:
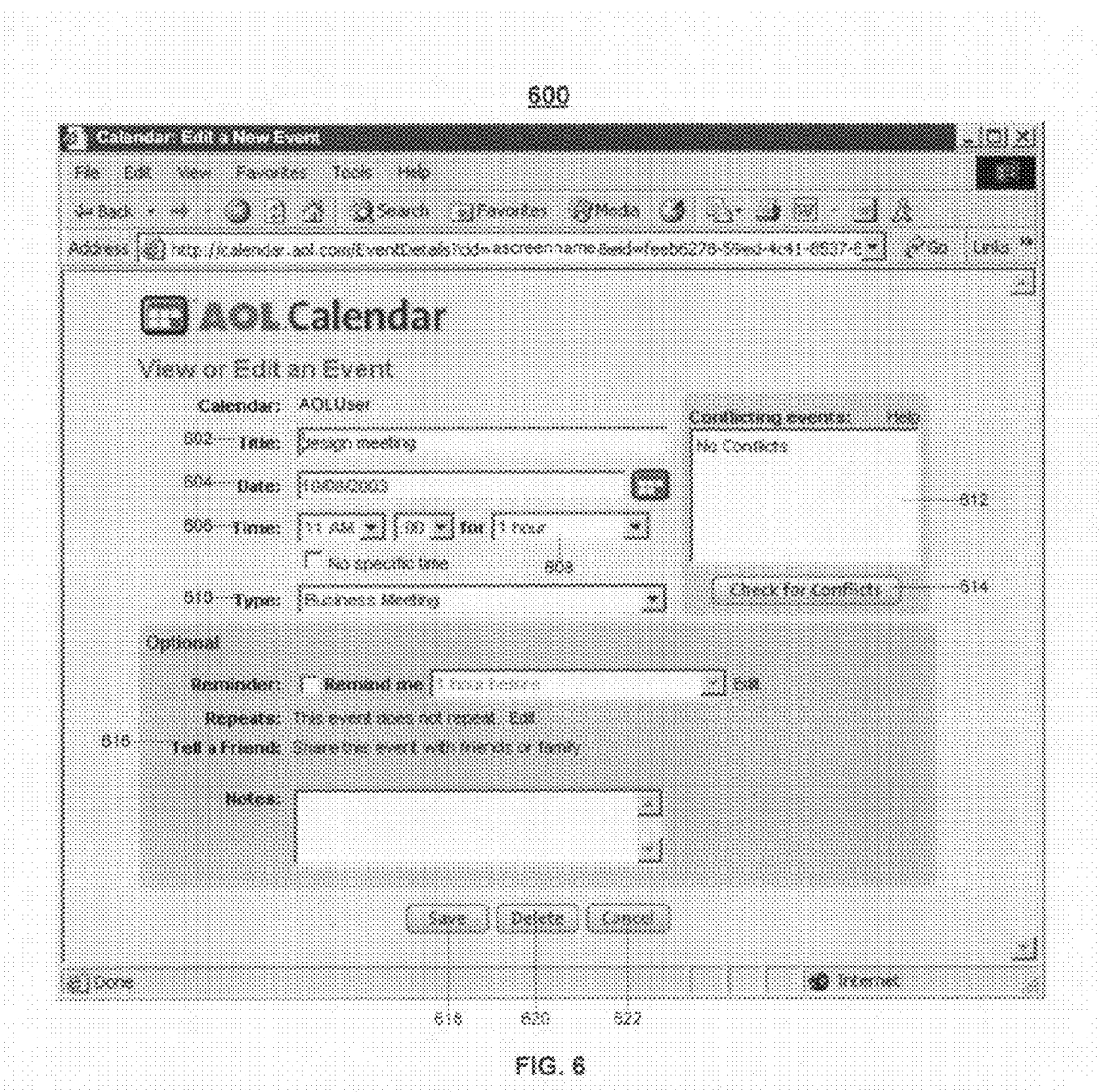
FIG. 6 is an illustration of an exemplary interface for modifying an event in a calendar application.

Referring to FIG. 6, one implementation of the electronic calendar interface 300 for use with one or more of the systems described herein includes an event specification tool 600 that enables the specification of new events to be added to the calendar. The event specification tool 600 is displayed after the "Add Event" button 306 or the "Add Task" button 308 from FIG. 3 is selected. A descriptive title for the new event may be entered into a title text field 602, and a date for the new event may be specified in a date text field 604. Time selection boxes 606 may be used to select the time of the event, and a duration selection box 608 may be used to specify the length of the event. A type for the new event may be chosen from a type selection box 610. For example, an event may be categorized as an appointment, a business meeting, a lunch, a personal meeting, or some other category, including both standard categories provided by a calendar system and user-defined categories.

In one implementation, conflicts between the new event and events already existing in the calendar may be displayed on the events specification tool 600 in a conflicts text box 612. The conflicts text box 612 will list events in the calendar that conflict with the new event, and the list may be produced by selecting a conflict check button 614. If no events in the calendar conflict with the new event, then the conflicts text box 612 may include the text "No Conflicts." The details of the new event specified in text boxes 602 and 604 and selection boxes 606-610 may be changed to eliminate one or more conflicts listed in the conflicts text box 612.

In another implementation, other people may be invited to the new event. Selecting a sharing link 616 may display a tool (see FIG. 7) for choosing the people that are to be invited to the new event.

In another implementation, the event specification tool 600 also enables the modification of existing events. The tool 600 may be presented for an existing event with the details of the existing event already specified.

Any changes made to the details of a new event or an existing event may be saved by selecting a save button 618. An existing event also may be deleted from the calendar through use of a delete button 620. Any changes made to the details of a new event or an existing event may be undone and discarded by selecting a cancel button 622.

Figure 7:
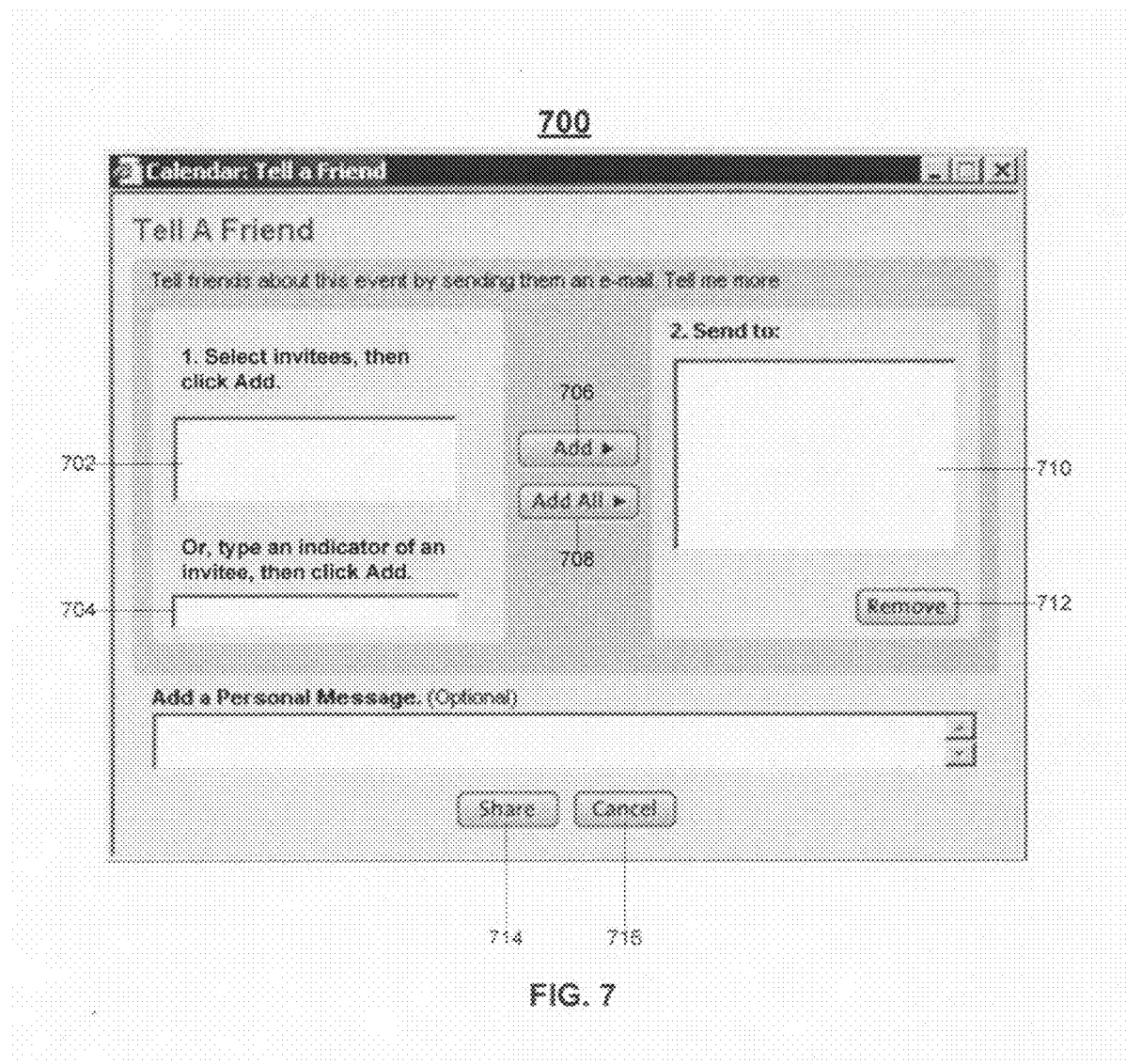
FIG. 7 is an illustration of an exemplary interface for specifying the invitees to an event in a calendar application.

Referring to FIG. 7, an implementation of the electronic calendar interface 300 also may include a mechanism for specifying the people to be invited to an event. An invitation tool 700 for specifying invitees to an event may be displayed after the sharing link 616 from FIG. 6 is selected from the event specification tool 600 for an event. Invitees to the event may be chosen from a possible invitee list 702 that may include all possible invitees to the event. The names of invitees also may be entered manually into an invitee text box 704.

In one implementation, selecting an add button 706 after one or more invitees have been selected from the possible invitee list 702 or entered into the invitee text box 704 adds the selected or entered names to the set of people that are to be invited to the event for which the invitation tool 700 was displayed. Alternatively or additionally, all names included in the possible invitee list 702 may be added to the set of invited people by selecting an "Add All" button 708.

In another implementation, the names of the people added to the set of people to be invited may be listed in a selected invitee list 710. Invitees may be removed from the selected invitee list, and additionally or consequently from the set of people to be invited to the event, by selecting a remove button 712.

An invitation may be sent to each of the people with names listed in the selected invitee list 710 by selecting a share button 714. Any changes made to the set of people to be invited may be undone and discarded through use of a cancel button 716.

Figure 8:
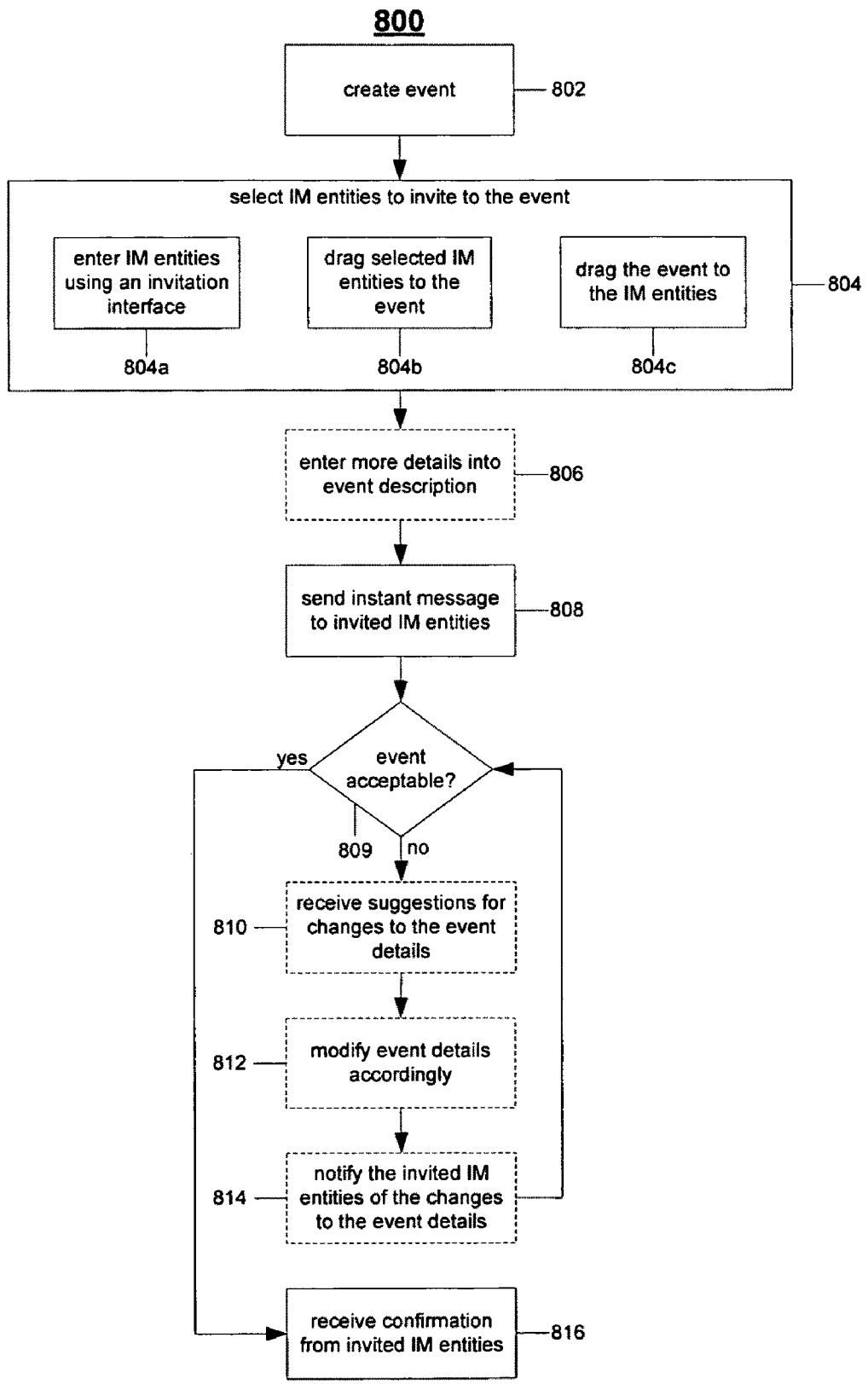
FIG. 8 is a flow chart of an exemplary process allowing a user to invite invitees to a specified electronic calendar event.

Referring to FIG. 8, a process 800 allows a user to invite invitees to an event. The process 800 may involve use of one or more of the buddy list interface 200 from FIG. 2, the electronic calendar interface 300 from FIGS. 3-5, and the associated tools 600 and 700 from FIGS. 6 and 7. For example, the process 800 may be used to invite people listed on the buddy list interface 200 to an event created within the electronic calendar interface 300.

The process 800 includes creating an event using, for example, the event specification tool 600 (802). Creating the event may include, for example, providing information for one or more of the boxes 602-610. The process 800 also includes selecting IM entities to invite to the event (804). IM entities may include, for example, (i) individuals, such as, for example, individual buddies, (ii) groups of individuals, such as, for example, a buddy group, or (iii) organizations, where each IM entity has an IM screen name or other IM account identifier.

IM entities may be selected (804) in various ways. For example, the invitor may use an invitation interface to enter IM entities to be invited to the event (804a). An invitation interface may be, for example, the invitation tool 700, and in one implementation of the process 800, the invitor may select the sharing link 616 in conjunction with (before, during, or after) creating the event (802). Upon selecting the sharing link 616, the invitation tool 700 is displayed and IM entities may be selected or entered, for example, in one or more of the invitee lists, as explained in the discussion of the invitation tool 700.

As another example of selecting IM entities (804), the invitor may select IM entities in various ways and drag the selected IM entities to the event to which the selected IM entities are to be invited (804b). In one implementation of the process 800, the IM entities are selected from a buddy list included in the buddy list interface 200. The selected entities may be dragged from the buddy list interface to a representation of the event included, for example, in at least one of the month, the week, or the day views of the electronic calendar interface 300. The representation of the event also may be a free-standing icon, for example. The action of dragging the IM entities to the event, or dragging and dropping, selects the IM entities as invitees to the event.

As yet another example of selecting IM entities (804), the invitor may select and drag the event to the IM entities to be invited to the event (804c). In one implementation of the process 800, a representation of the event is included in at least one of the month, the week, or the day views of the electronic calendar interface 300. The event is dragged from the electronic calendar interface 300 to the names of the IM entities to be invited to the event included in the buddy list interface 200. The action of dragging the event to the IM entities, or dragging and dropping, selects the IM entities as invitees to the event.

After IM entities have been selected as invitees to the event (804), other details of the event optionally may be specified (806). For example, one or more of the fields in the event specification tool 600 may not have been filled-in or may need to be modified. After the event creator is satisfied with the event, an invitation to the event is sent to the selected IM entities (808). The invitation is in the form, for example, of an instant message. If an IM entity is not available to receive an instant message, then an e-mail message, or some other form of communication, may be sent automatically to the IM entity. The instant message may include, for example, a description of the proposed event and a link that, when selected, causes the event to be added to the calendar of the IM entity that received the invitation. The instant message also may include a form with which changes to the details specifying the event may be suggested and sent to the event creator and, optionally, other invitees. Changes may be suggested so as, for example, to avoid a conflict. In one implementation, the electronic calendar interface 300 is used to create an event, and the calendar application 112 sends the event to the IM application 114 for sending invitation IMs. The IM application 114 packages the information in an instant message to be sent to the IM entities. The packaging of the invitation IMs designates the IM as including an invitation to a calendar event and includes the event information in a specified format. Upon receipt of the invitation IM at another system, the IM application 114 on that other system recognizes the destination an inserts a link to a script or other routine for loading the event into the local calendar application 112. The packaging of the invitation IMs also includes a form that can be used to suggest changes. The form may be preloaded with the event information and may be opened within the IM application 114 or the calendar application 112 on that other system, or using some other application. The form also includes a mechanism for sending the form back to the invitor.

The invitation is received by an invited IM entity and a determination is made as to whether the event is acceptable (809). The determination may be manual if, for example, the invited IM entity objects to the event, or the determination may be automatic if, for example, there is a time conflict. If the event is acceptable, the invited IM entity sends a confirmation, which the event creator receives (816). If the event is not acceptable, then the invited IM entity sends suggested changes. Any suggested changes sent to the event creator may be received in, for example, an instant message (810), and the event may be modified accordingly (812). An updated invitation may be sent to notify all of the invited IM entities of the changes that have been proposed to the event (814), and the invited IM entity again determines if the (now modified) event is acceptable (809). As described in the discussion of FIGS. 12A-12M, the invitation displayed for the IM entities may be updated each time a change to the proposed event is made and propagated. Further, if an invitee has already accepted an event before all changes have been made to the event, the invitee may be notified of the additional changes made since the invitee accepted the event.

When an invitee accepts the invitation to the event, a confirmation to the invitation is sent to the event creator. The event creator then receives one or more confirmations (816). In one implementation, instant messages including reminders of the event are sent as the time for the event approaches.

Figure 9:
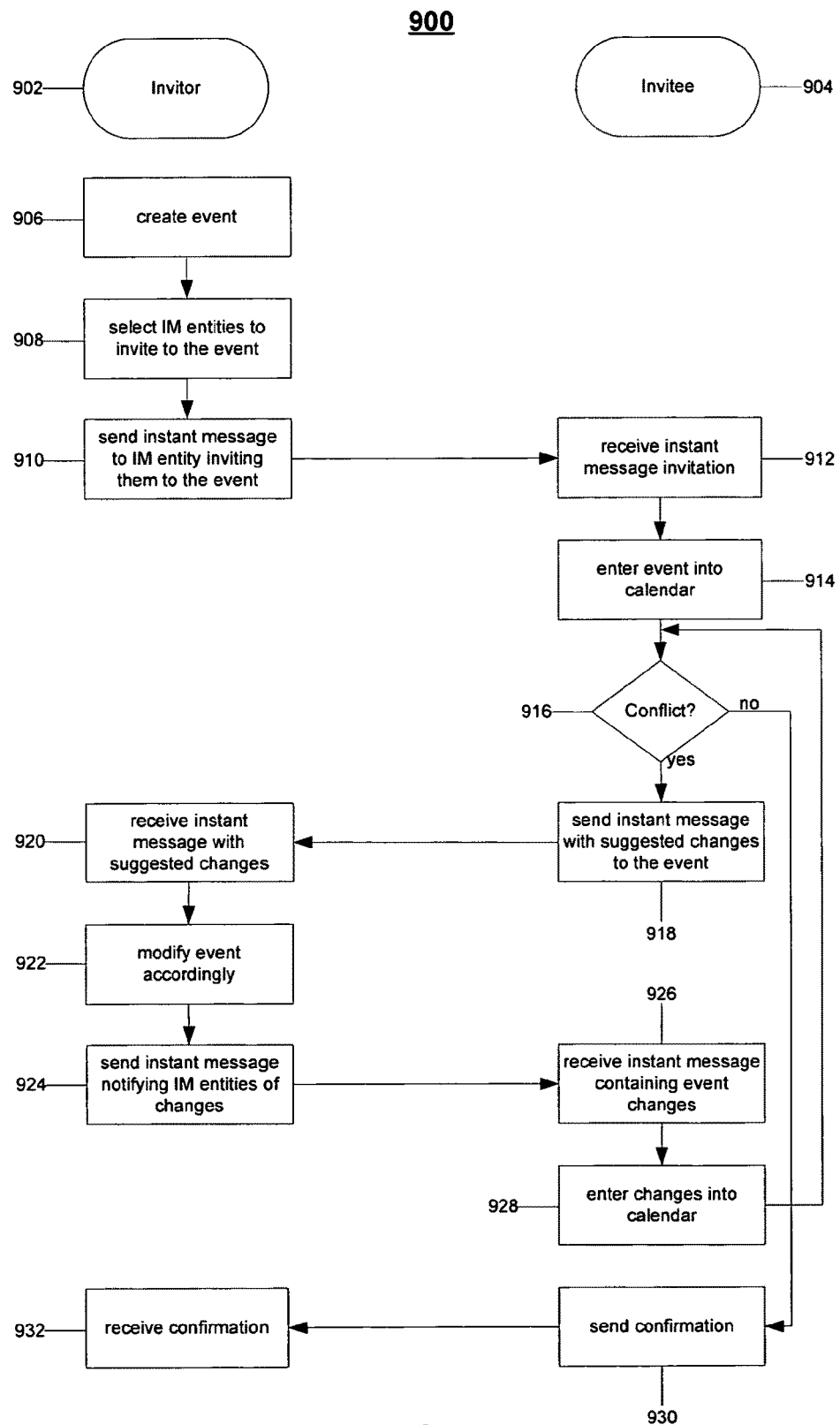
FIG. 9 is a flow chart of another exemplary process for allowing a user to invite invitees to a specified electronic calendar event.

Referring to FIG. 9, a scheduling process 900 may occur between an invitor 902 and an invitee 904 that is to be invited to an event created by the invitor 902. The process 900 begins when the invitor 902 creates an event within, for example, an electronic calendar application, using, for example, the electronic calendar interface 300 from FIGS. 3-5 (906). The invitor 902 then selects the IM entities to be invited to the event (908). An instant message is sent from the invitor 902 to the selected IM entities, including the invitee 904, inviting the selected IM entities to the event (910). If the invitee 904 is not able to receive an instant message from the invitor 902, then an e-mail message, or other form of communication, may be sent from the invitee 904 to the invitor 902.

The invitor 902 knows when the invitee 904 is unable to receive an instant message from the invitor 902 based on a lack of presence displayed for the invitee 904 in a buddy list associated with the invitor 902. For example, the name of the invitee 904 may be included in the offline buddy group 206d from FIG. 2. When it is determined that the invitee 904 is unavailable, the invitor 902 may manually create and send the e-mail message to the invitee 904. Additionally or alternatively, the e-mail message may be created and sent automatically when the name of the invitee 904 is found in the offline buddy group 206d based on an e-mail address that has been associated with the name of the invitee 904.

In another implementation, if the invitee 904 is unable to receive an instant message from the invitor 902, then an instant message including the invitation may be placed in a queue of instant messages to be sent to the invitee 904 when the invitee 904 becomes available to receive instant messages. For example, the instant messages may be sent to the invitee 904 as soon as the invitee 904 next logs in to the IM system. While the instant message remains in the queue of instant messages to be sent to the invitee 904, the invitor 902 may be presented with an indication that the invitation has not been seen or confirmed by the invitee 904.

The queue may be used to store instant messages sent to the invitee 904 while the invitee 904 is unable to receive the instant messages. For example, the queued instant messages may include invitations to calendar events that are proposed while the invitee 904 is unable to receive instant messages. The queue may be stored on a computer that the invitee 904 uses to access the IM system, such as the client system 110 of FIG. 1, or otherwise. The queue also may be stored on a server of the IM system that is accessed by the invitee 904, such as the host server 130 of FIG. 1. The server may store one queue for each user of the IM system.

The queue for the invitee 904 may be monitored to prevent for example, burdening the invitee 904 with invitations to events that have already passed. For example, invitations to events that have already happened may be deleted from the queue periodically or in response to some event, such as the occurrence of an event for which an invitation has been placed in the queue. As another example, as an invitation is removed from the queue for delivery to the invitee 904, the date of the event for which the invitation is sent may be checked to confirm that the date has not already passed. If the date has not passed, then the invitation is delivered to the invitee 904, and if the date has passed, then the invitation is removed from the queue and not delivered to the invitee 904.

In yet another implementation, an e-mail message including an invitation to the event may be created and sent automatically to the invitee 904 and an alert of the e-mail message may be placed in a queue of instant messages to be sent to the invitee 904 when the invitee 904 next becomes available to receive instant messages. The queue in which the alert is placed may be the same queue in which other instant messages, including invitations to events, are queued for the invitee 904. When the invitee 904 is next available to receive instant messages, the invitee 904 is sent the alert. The alert may, for example, automatically take the invitee 904 to the e-mail message and enable the invitee 904 to accept or suggest changes to the proposed event, provide a link to the e-mail message, or merely alert the invitee 904 to the existence of the e-mail message. If the invitee 904 views the e-mail message before the alert is sent to and viewed by the invitee 904, then the alert is removed from the queue of instant messages. While the alert remains in the queue of instant messages to be sent to the invitee 904, the invitor 902 may be presented with an indication that the invitation has not been seen or confirmed.

By way of example, the invitor 902 may select five IM entities to be invited to the event. Of the five IM entities, two may be online and available to receive instant messages from the invitor 902. Those two IM entities, of which the invitee 904 is one, are sent invitations to the event in instant messages that are immediately received. The other three IM entities may not be available to receive instant messages. Of those three IM entities, one may have specified that instant message invitations to events be queued and delivered the next time the IM entity is available to receive instant messages, so an invitation is sent and queued for later delivery to the IM entity. The remaining two IM entities may have specified that e-mail invitations be sent when the IM entities are not available to receive instant messages and that instant messages alerts of the e-mail invitations be queued for delivery when each of the IM entities next becomes available to receive instant messages. As such, e-mail invitations are sent to and instant message alerts of the e-mail invitations are queued for the remaining two IM entities. One of the two IM entities receives the e-mail message before becoming available to receive instant messages, so the instant message alert is removed from the queue of instant messages for that IM entity. The other IM entity logs in to the IM system and receives the alert, which takes the IM entity to the e-mail invitation.

In instances where the invitee 904 is available to receive an instant message by the invitor 902, the invitee 904 receives the instant message sent by the invitor 902 (912). The invitee 904 enters the event described in the invitation into an electronic calendar application that stores events for the invitee 904 (914). A determination is made, either manually or by the electronic calendar application, as to whether the event to which the invitee 904 was just invited conflicts with other events stored by the electronic calendar application (916). If the event does create a conflict with the previously stored events, then the invitee 904 determines what changes need to be made to the event for the invitee 904 to attend. These changes are suggested to the invitor 902 in an instant message (918).

The suggested changes are received by the invitor 902 (920), and the invitor 902 modifies the event according to the suggested changes received from the invitee 904 (922). The invitor 902 sends a new instant message to the invited IM entities, including the invitee 904, notifying the invited IM entities of the changes that have been made to the event (924).

The new instant message outlining the changes is received by the invitee 904 (926). The invitee 904 modifies the event stored in the electronic calendar application (928). The modification may be made automatically or in response to the invitee 904 accepting the proposed changes. A determination is made again as to whether the event conflicts with events already stored by the electronic calendar application (916). If a conflict is found, then the process of modifying the event according to suggested changes is repeated. If no conflict is found (on this iteration through operation 916 or the earlier iteration), then the invitee 904 sends a confirmation to the invitor 902 (930), and the invitor 902 receives the confirmation (932).

When the invitee 904 is sent an invitation to the event in an e-mail message while other invitees are sent the invitation in an instant message, the invitee 904 may participate in the process of updating the event in various ways. In one implementation, the other invitees may modify the event, and the invitee 904 may receive a second e-mail message outlining the changes made to the event after the changes are agreed upon by all of the invitees (912-932). In another implementation, the invitee 904 may receive a new e-mail message after every change that is accepted or made by the invitor 902. Each e-mail message may include a single button that may be used to send a communication (likely an e-mail) to the invitor 902 and/or the entire group of invitees so that the invitee 904 may participate in the process of changing the event whenever the invitee 904 receives an invitation.

Figure 10:
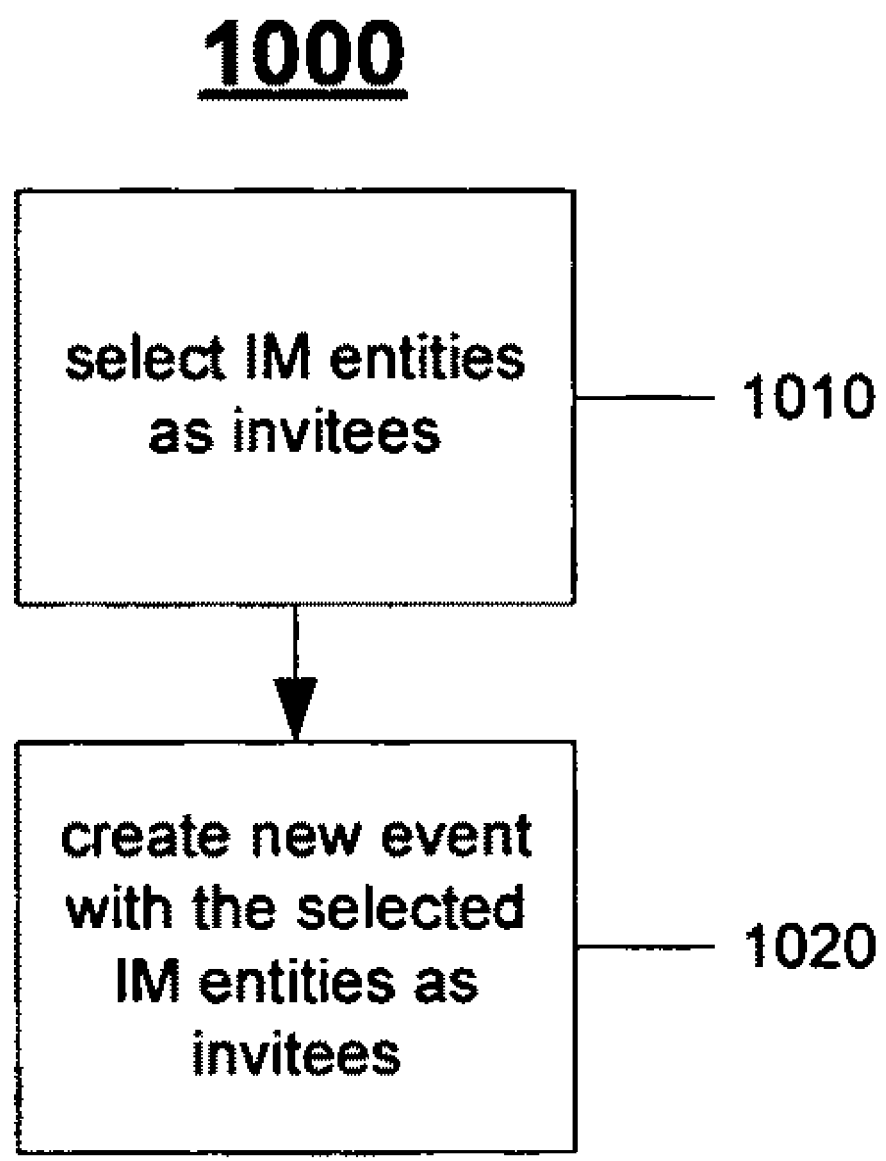
FIG. 10 is a flow chart of an exemplary process for inviting invitees to an unspecified electronic calendar event.

Referring to FIG. 10, a process 1000 may be used to specify the invitees to an event before details of the event itself are specified. In other words, the IM entities to be invited to the event may be selected before the event is created (1010). After the IM entities to be invited to the event have been chosen, the details of the event to which the IM entities are to be invited are specified (1020). Referring again to FIGS. 2-5, in one implementation of the process 1000, selection (1010) includes dragging and dropping a representation of a blank period of time in the electronic calendar interface 300 during which the proposed event is to occur over a screen name or group name (or a pre-selected set of names) from the buddy list interface 200. For example, the IM entity with the screen name 204*a* (FIG. 2) may be selected as an invitee to an event to occur during the blank period 304a (FIG. 3) by having both the buddy list interface 200 and the calendar interface 300 open on a desktop of a computer display, and dragging and dropping the blank period 304a over the screen name 204a. In other implementations the IM entities may be selected from a list or other interface, such as, for example, the invitation tool 700.

In further implementations, selection (1010) may include dragging and dropping, for example, a group name (or a pre-selected set of names) in the buddy list interface 200 over a representation of the blank period of time during which the proposed event is to occur from the electronic calendar interface 300. For example, the buddy group "Family" 206c may be selected as an invitee to an event to occur during the blank period 304a by dragging and dropping the buddy group "Family 206c over the blank period 304a.

Figure 11:
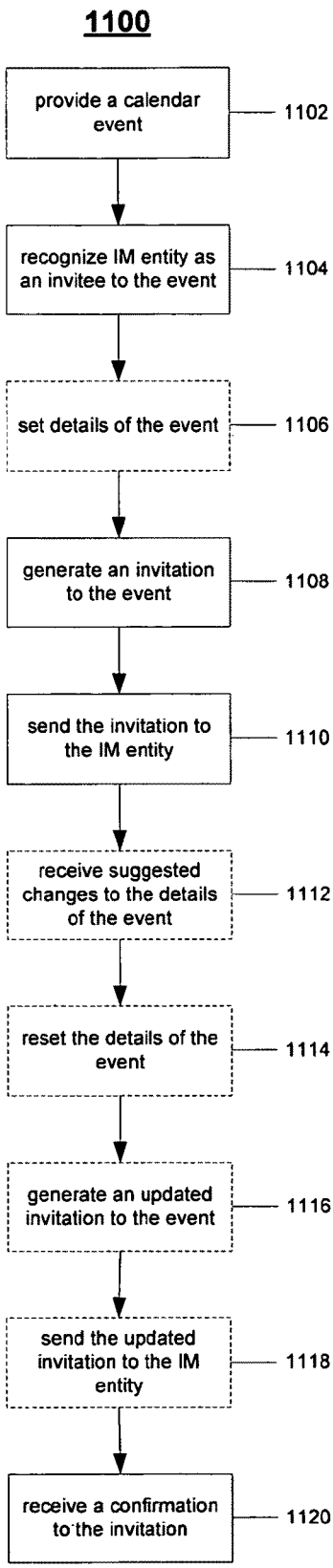
FIG. 11 is a flow chart of an exemplary process allowing a system to provide a user with collaborative scheduling of electronic calendar events.

Referring to FIG. 11, a process 1100 enables collaborative scheduling of electronic calendar events among a set of IM entities. The process 1100 enables, for example, implementations of the processes 800 and 900 from FIGS. 8 and 9. The process 1100 may be performed, for example, by a client system 110 or a host server 130, alone or in combination.

The process 1100 includes providing a calendar event from an electronic calendar application, such as, for example, the electronic calendar interface 300 (1102). The calendar event may be provided, for example, in response to a user request for creation of a new calendar event. An IM entity is recognized by the calendar application as an invitee to the event (1104). In one implementation, recognizing an IM entity as an invitee to the event includes recognizing when an existing event or a blank period in the calendar application has been dragged over the name of the IM entity. In another implementation, recognizing the IM entity as an invitee includes recognizing when the IM entity is selected from a list of IM entities. In a further implementation, recognizing the IM entity includes recognizing when the IM entity has been entered into an area for specifying invitees to the event. Note that several of these implementations reverse the order of operations 1102 and 1104 by using blank periods for which no event has yet been created.

If necessary, the details of the event are set in the calendar application to user specified values, possibly including default values (1106), and an invitation to the event is generated (1108). The invitation is sent to the IM entity (the invitee) using, for example, an instant message (1110). If the IM entity is not able to receive instant messages, then the invitation may be sent to the IM entity using an e-mail message or other form of communication. The IM entity may suggest changes to the details of the event due to conflicts, for example, between the event and other events of the IM entity, and the changes may be received (1112). The details of the event may be reset according to the suggested changes (1114), and an updated invitation to the event may be generated (1116). The updated invitation may be sent to the IM entity (1118). If the IM entity does not find any conflicts between the updated event and other events stored for the IM entity, then the IM entity sends a confirmation to the invitation, which is then received (1120). In one implementation, instant message reminders may be sent to the IM entity as the time of the event approaches.

As explained in more detail below, FIGS. 12A-12M illustrate operations that may be experienced in one implementation of the above concepts. The operations include inviting an invitee to a calendar event and receiving feedback from the invitee.

Figure 12A:
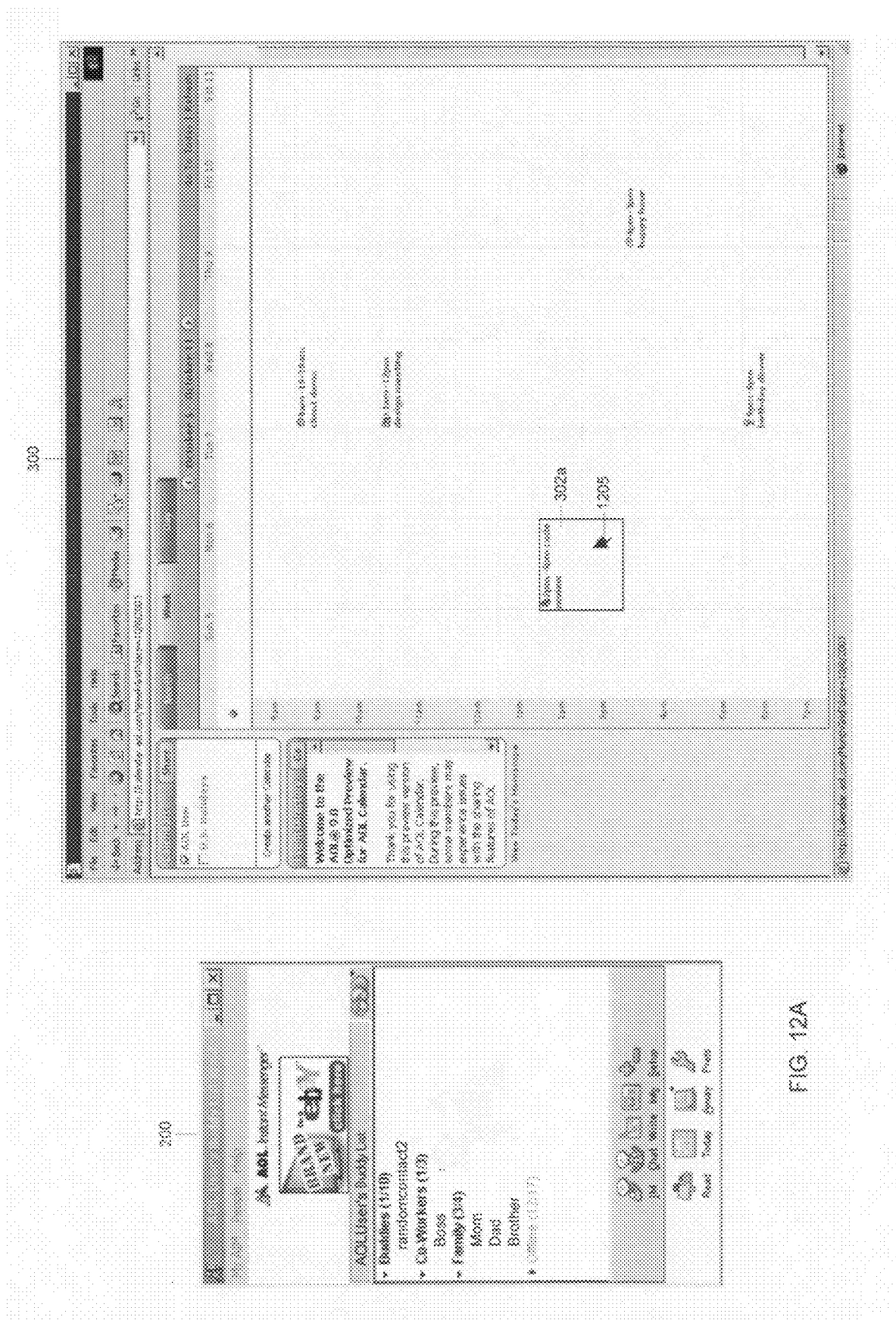
FIGS. 12A-12M are illustrations of exemplary interfaces displayed during collaborative scheduling of calendar events.

Referring to FIG. 12A, while collaboratively scheduling calendar events, a user with a screen name AOL User interacts with the buddy list interface 200 and the electronic calendar interface 300. The buddy list interface 200 and the electronic calendar interface 300 may be displayed such that the user sees both the buddy list interface 200 and the electronic calendar interface 300 at the same time. One or more screen names may be selected in the buddy list interface 200, although none is shown as being selected in the buddy list 200 of FIG. 12A. The electronic calendar interface 300 may include one or more calendar events. For example, the calendar interface 300 includes a calendar event 302a. As indicated by the bold outline around the calendar event 302a, the calendar event 302a has been selected. A mouse pointer 1205 may be used to select the calendar event 302a, or a screen name.

Figure 12B:
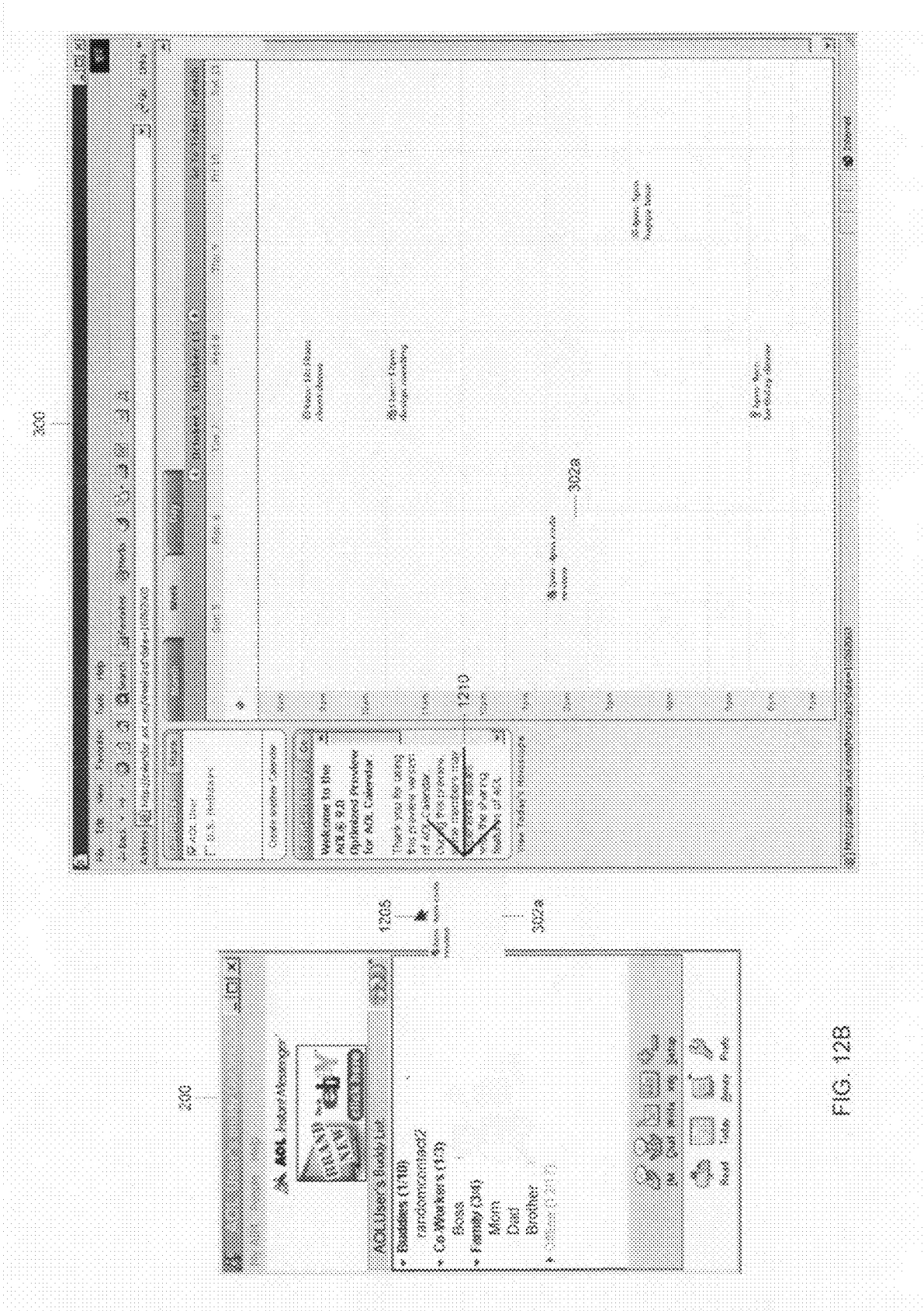
Figure 12C:
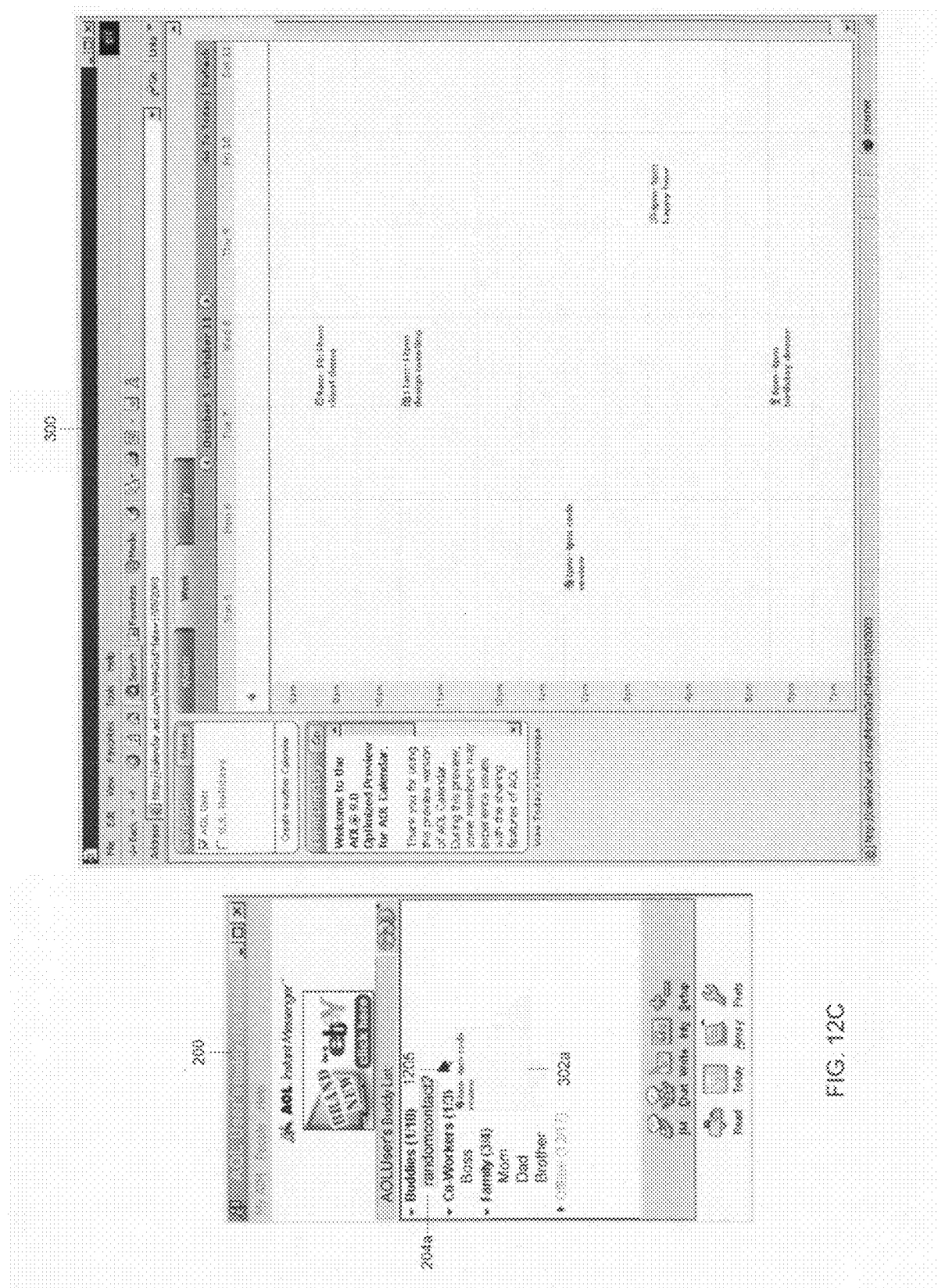

Referring to FIG. 12B, the event 302a has been selected from the electronic calendar interface 300 and is being dragged with the mouse pointer 1205. As indicated by an arrow 1210, the event 302a is being dragged towards the buddy list interface 200. Referring to FIG. 12C, the event 302a has been dragged from the electronic calendar interface 300 over the screen name 204a, "randomcontact2," in the buddy list interface 200, thereby selecting the screen name 204a as an invitee to the calendar event 302a. The selection of screen name 204a is shown by the highlighting of the screen name 204a in FIG. 12C.

Figure 12D:
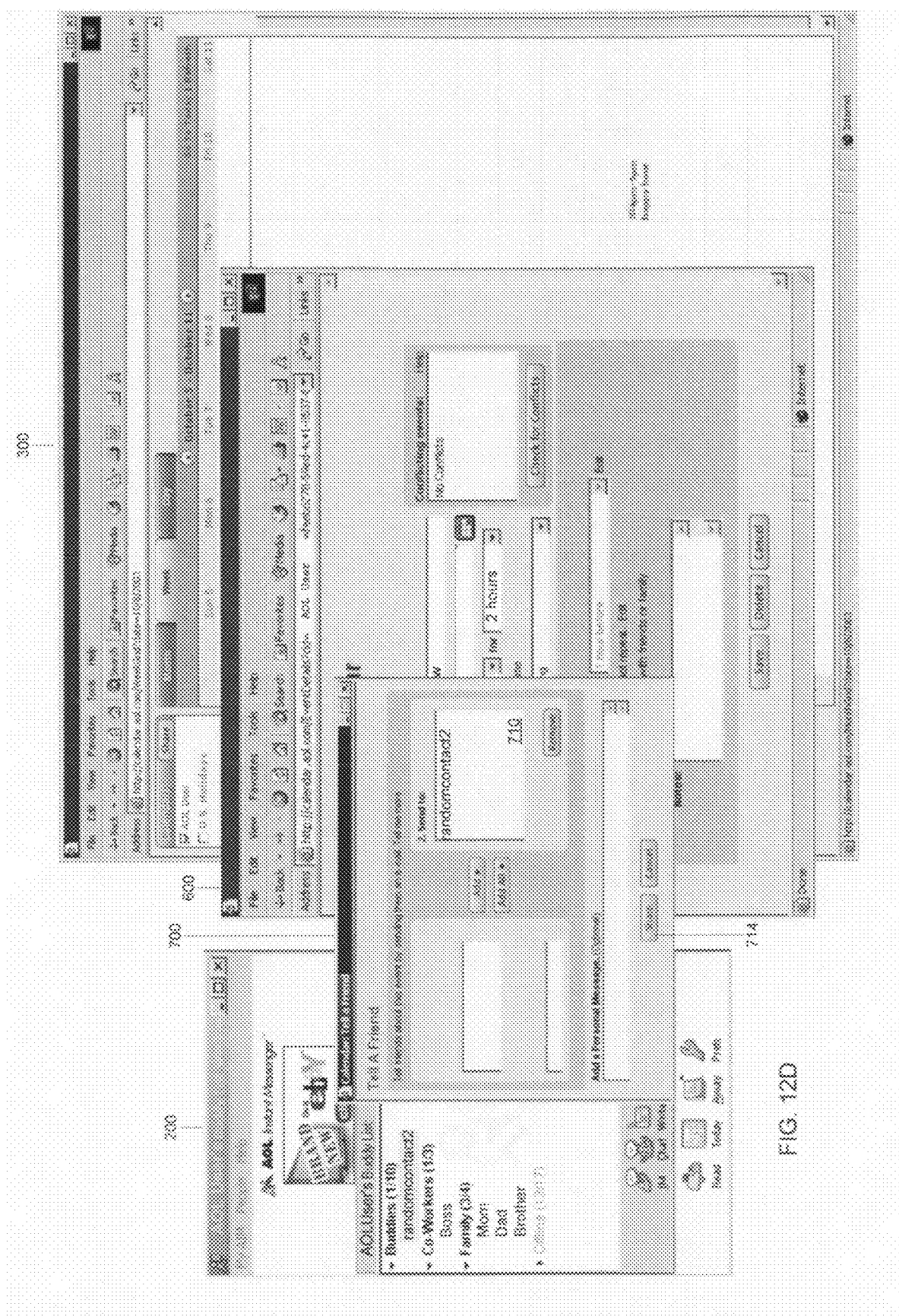

Referring to FIG. 12D, by dropping the event 302a onto the screen name 204a, the screen name 204a has been entered automatically in the selected invitee list 710 of the invitation tool 700 that is displayed along with the event specification tool 600 for the calendar event 302a. An invitation to the event 302a may be sent to randomcontact2 through selection of the share button 714, which sends an invitation in an instant message.

Figure 12E:
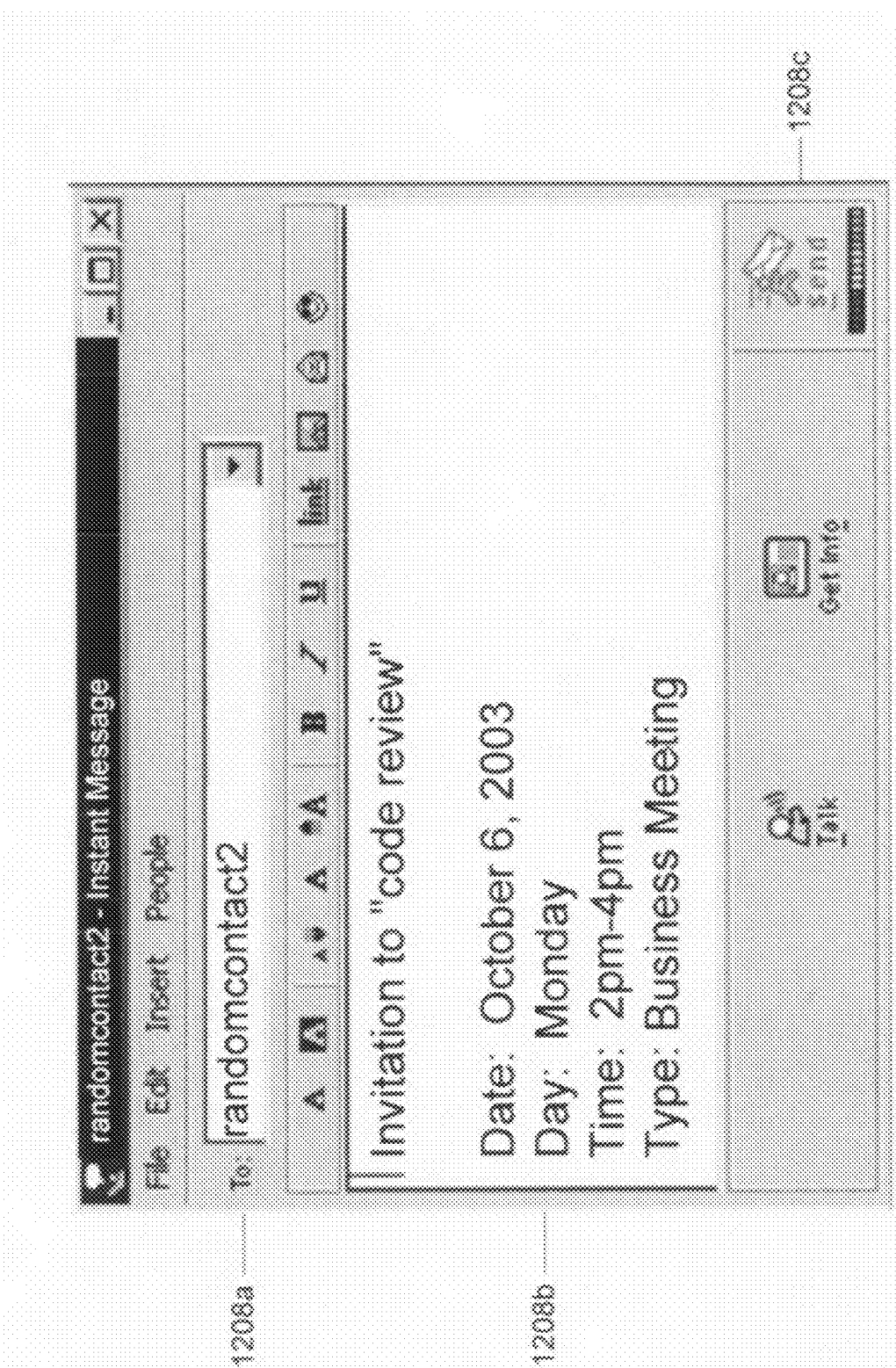

Referring to FIG. 12E, one implementation of an instant message 1208 is shown, such as might be sent through selection of the share button 714. The instant message 1208 includes a "To" field 1208a indicating that the instant message is for randomcontact2, a body field 1208b including a description of the calendar event, and a send button 1208c. Selecting the send button 1208c sends the description of the calendar event in the body field 1208b to the recipient(s) of the instant message specified in the "To" field 1208a. In another implementation, the instant message 1208 may not be shown, and the instant message inviting randomcontact2 to the event may be sent automatically and transparently after the share button 714 has been selected.

Figure 12F:
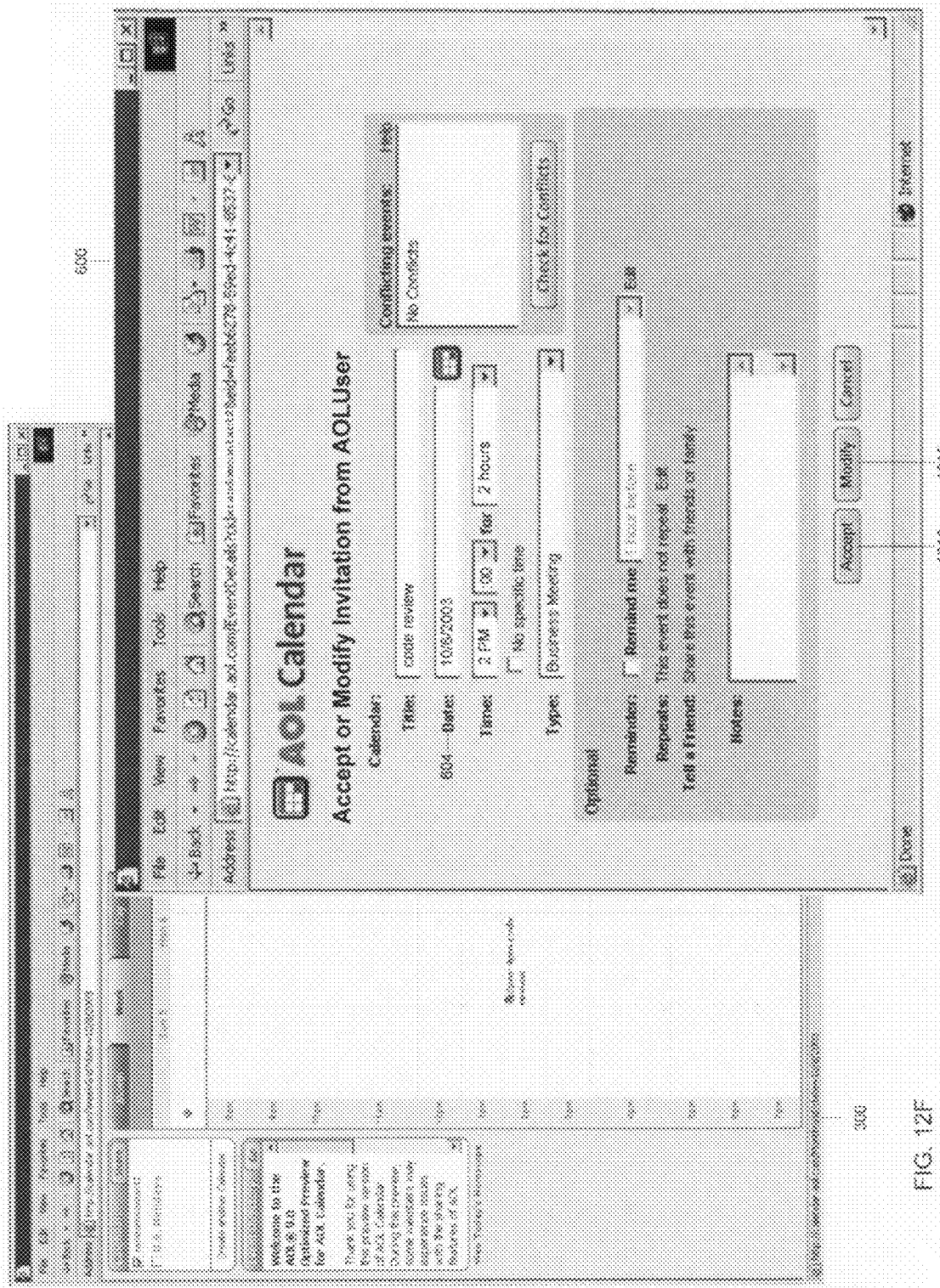

Referring to FIG. 12F, the instant message 1208 has been received and the event specification tool 600 has been opened for the proposed event to which randomcontact2 has been invited.

The event specification tool 600 may be opened automatically by, for example, the IM system for randomcontact2 (i) recognizing that the received IM 1208 is an invitation to a calendar event, and (ii) causing a calendar application to open and display the event data in the tool 600. The event specification tool may be opened manually by, for example, the user randomcontact2 reading the received IM 1208 and selecting an embedded command that causes the tool 600 to open.

The event specification tool 600 may include an accept button 1210, the selection of which includes the event 302a in the electronic calendar interface 300 for randomcontact2. The electronic calendar interface 300 for randomcontact2 is shown in the background with the event 302a included, such as would occur after selecting the accept button 1210. Randomcontact2 also may modify the details of the event specified in the event specification tool 600 by directly changing the entries displayed. Such changes may be based on, for example, conflicts with other events. For example, randomcontact2 may change the date of the event specified in the date text field 604. After making the desired changes to the event, randomcontact2 may notify AOL User, who originally proposed the event, of the changes through selection of a modify button 1215. Selecting the modify button 1215 sends an instant message to AOL User describing the changes made by randomcontact2 to the proposed event. For example, randomcontact2 may propose a date change for the event 302a from Oct. 6, 2003 to Oct. 7, 2003 by modifying the date text field 604 and selecting the modify button 1215. An IM would be sent back to AOL User to inform AOL user of the proposed date change.

Figure 12G:
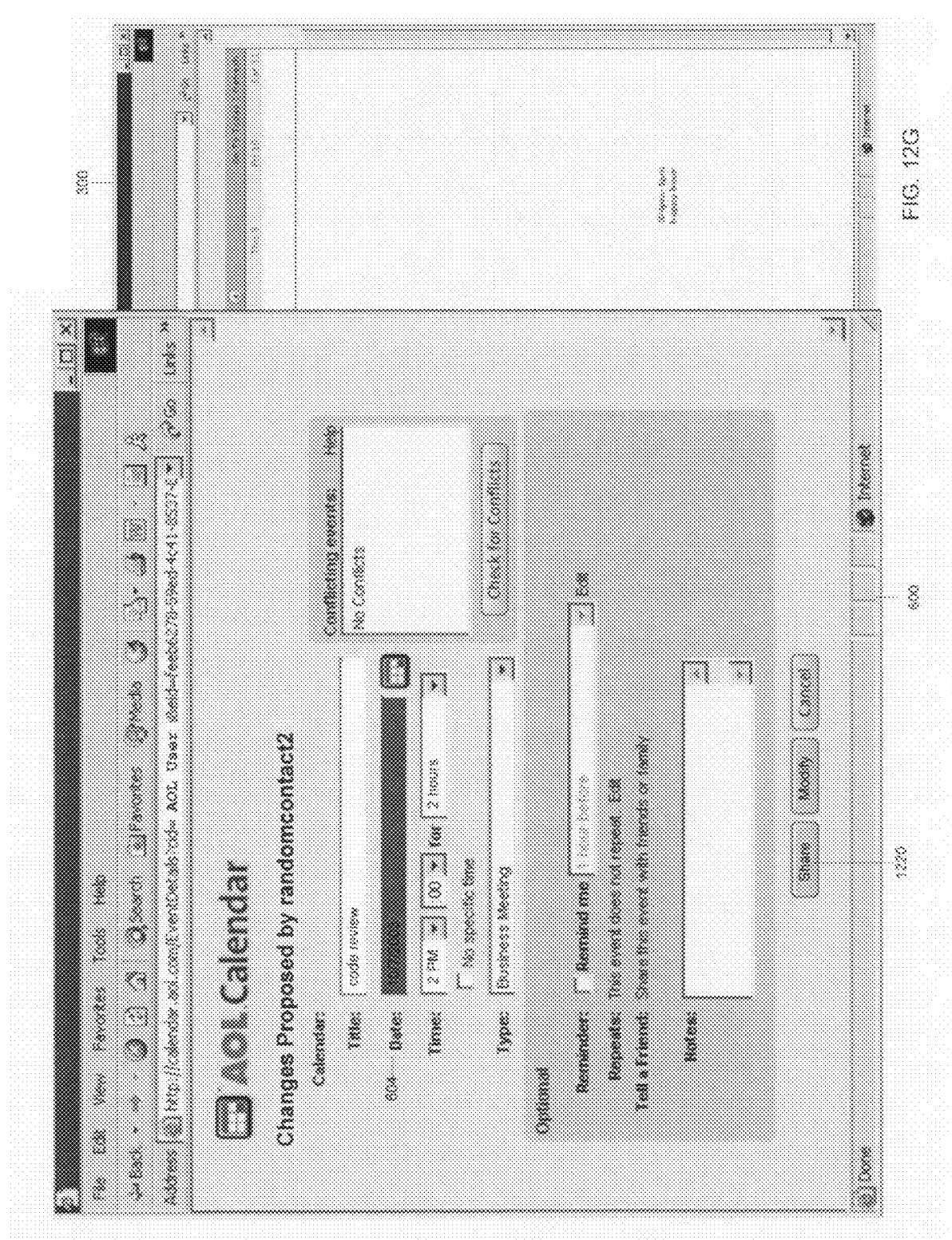

Referring to FIG. 12G the event specification tool 600 for AOL User is shown displaying the data for the event 302a and highlighting the changes proposed by randomcontact2. Note that the calendar interface 300 for AOL User is also displayed for the convenience of AOL User. The received instant message may, for example, cause the event specification tool 600 for AOL User to open automatically. The details of the event 302a may be further modified by AOL User with the event specification tool 600. Selecting a share button 1220 once again sends an updated invitation in an instant message to randomcontact2. In this manner, the event 302a may be modified until the details of the event 302a are agreed upon by AOL User and randomcontact2.

Figure 12H:
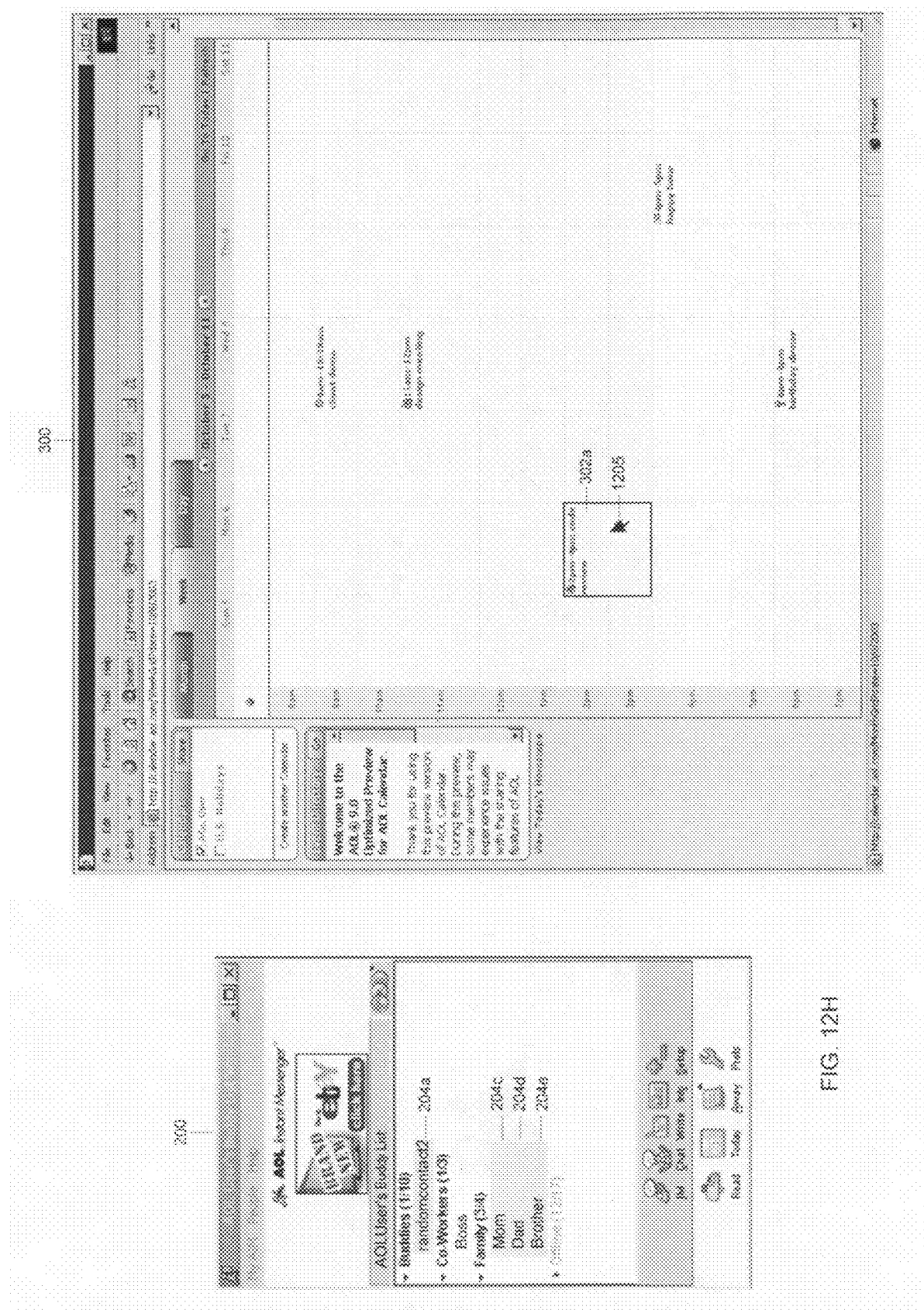

Referring to FIG. 12H, the user with the screen name "AOL User" may invite multiple invitees to an event. The user may select the event 302a in the calendar interface 300 and select multiple screen names in the buddy list interface 200. For example, in the buddy list interface 200, the screen names 204a ("randomcontact2"), 204c ("Mom"), 204d ("Dad"), and 204e ("Brother") have been selected.

Figure 12I:
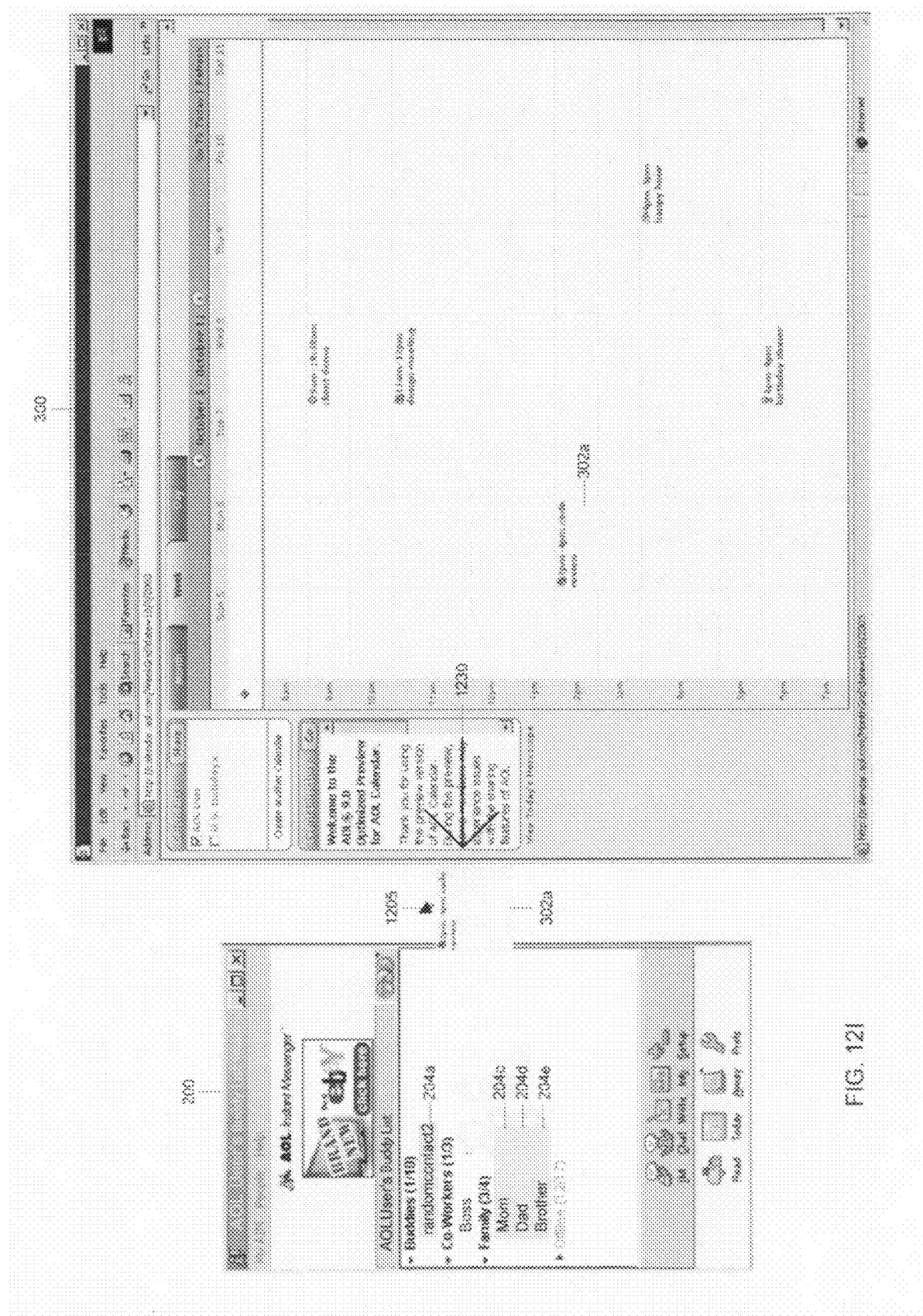
Figure 12J:
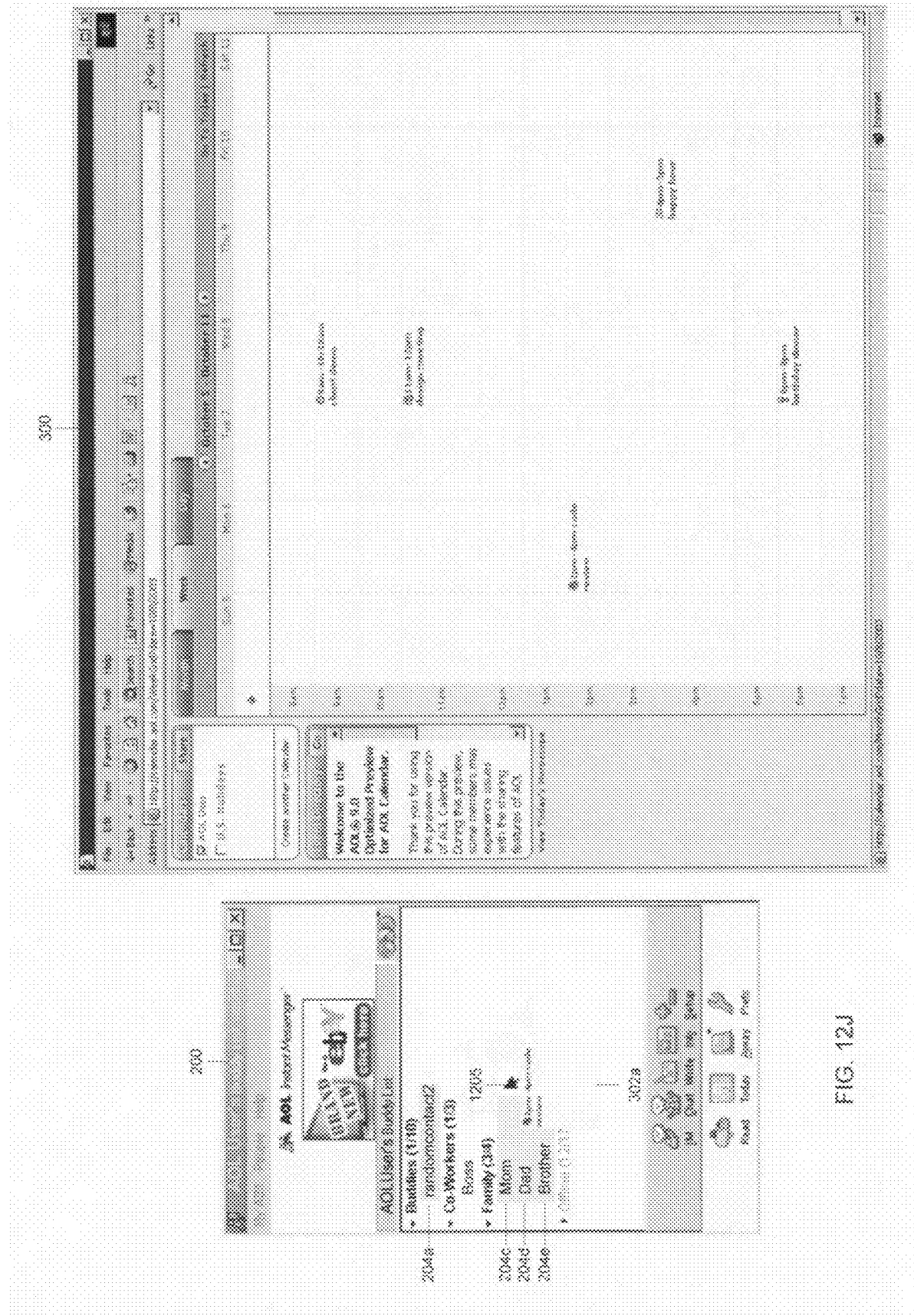

Referring to FIG. 12I, the user may then drag the event 302a towards the buddy list interface 200, where the screen names 204a and 204c-204e are selected, as indicated by an arrow 1230. Referring to FIG. 12J, the event 302a has been dragged from the electronic calendar interface 300 over one of the screen names 204a and 204c-204e in the buddy list interface 200, thereby selecting the screen names 204a and 204c-204e as invitees to the calendar event 302a.

Figure 12K:
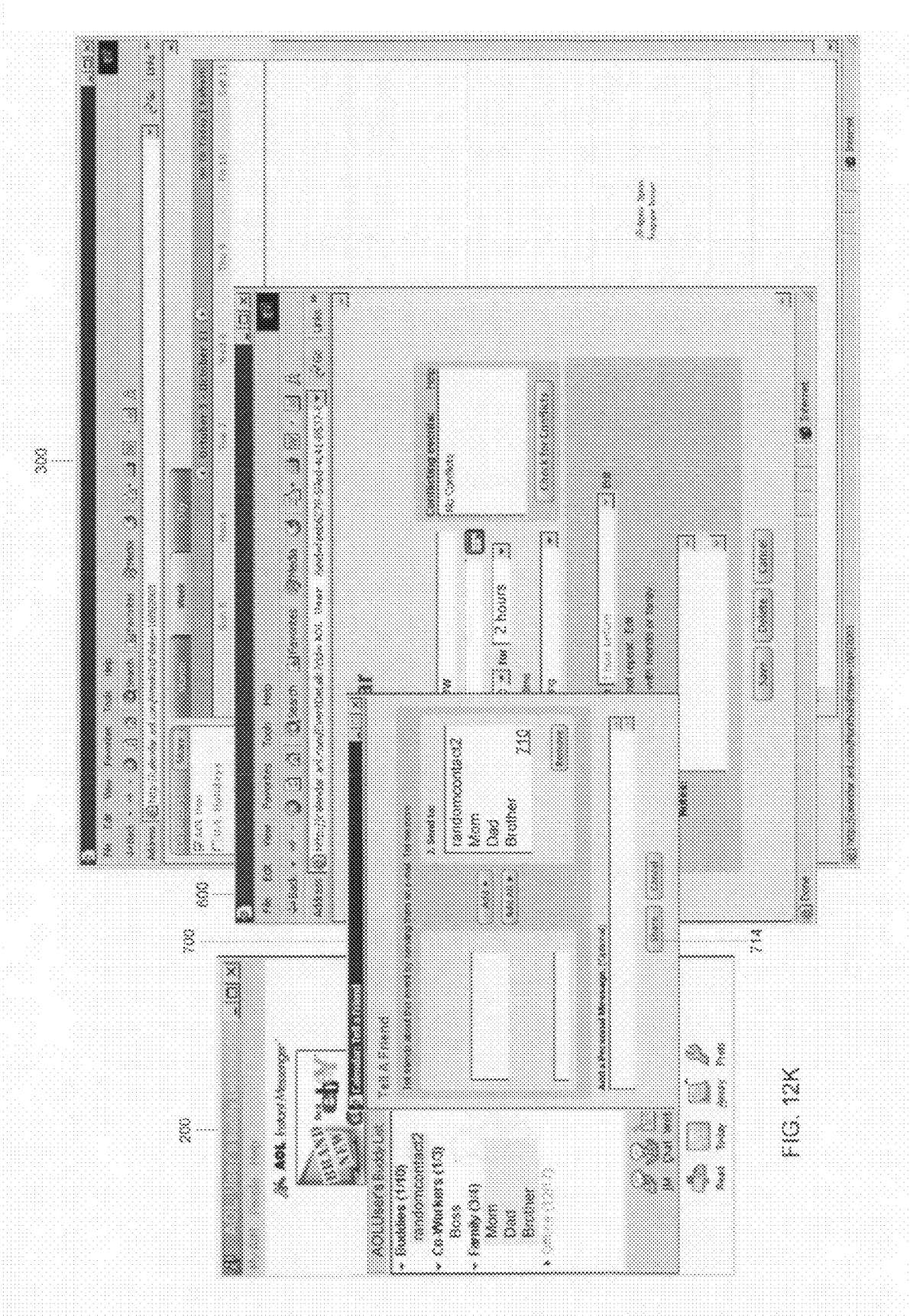

Referring to FIG. 12K, after dropping the dragged event 302a onto the buddy list interface 200, the screen names 204a and 204c-204e are entered automatically in the selected invitee list 710 of the invitation tool 700 that is displayed along with the event specification tool 600 for the calendar event 302a. The event may be shared with randomcontact2, Mom, Dad, and Brother through selection of the share button 714, which sends an invitation in a separate instant message to each of randomcontact2, Mom, Dad, and Brother.

Figure 12L:
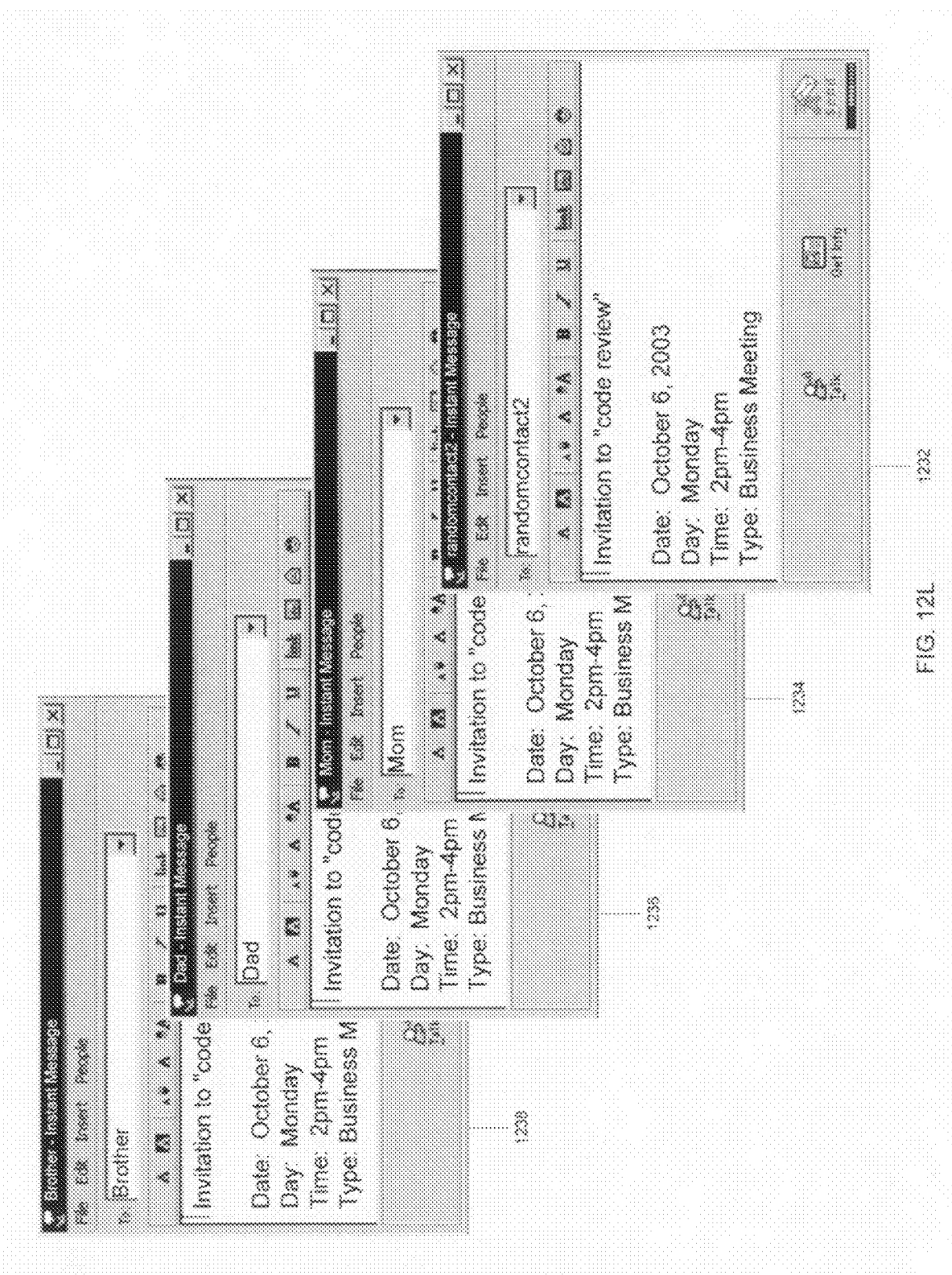

Referring to FIG. 12L, separate IMs 1232 1234, 1236, and 1238 are shown for each of randomcontact2, Mom, Dad, and Brother, respectively. These IMs 1232, 1234, 1236, and 1238 may, for example, be processed in a manner similar to IM 1208. In particular, each of randomcontact2, Mom, Dad, and Brother may make changes to the event as described above with respect to FIG. 12F, and AOL User may accept the changes and/or make further changes as described with respect to FIG. 12G. In another implementation, the instant messages 1230, 1232, 1234, and 1236 may not be shown, and the instant messages inviting randomcontact2, Mom, Dad, and Brother to the event may be sent automatically and transparently after the share button 714 has been selected. AOL User also may drag and drop the event 302a into a buddy group name, such as, for example, "Family," to invite multiple entities to the event 302a.

Figure 12M:
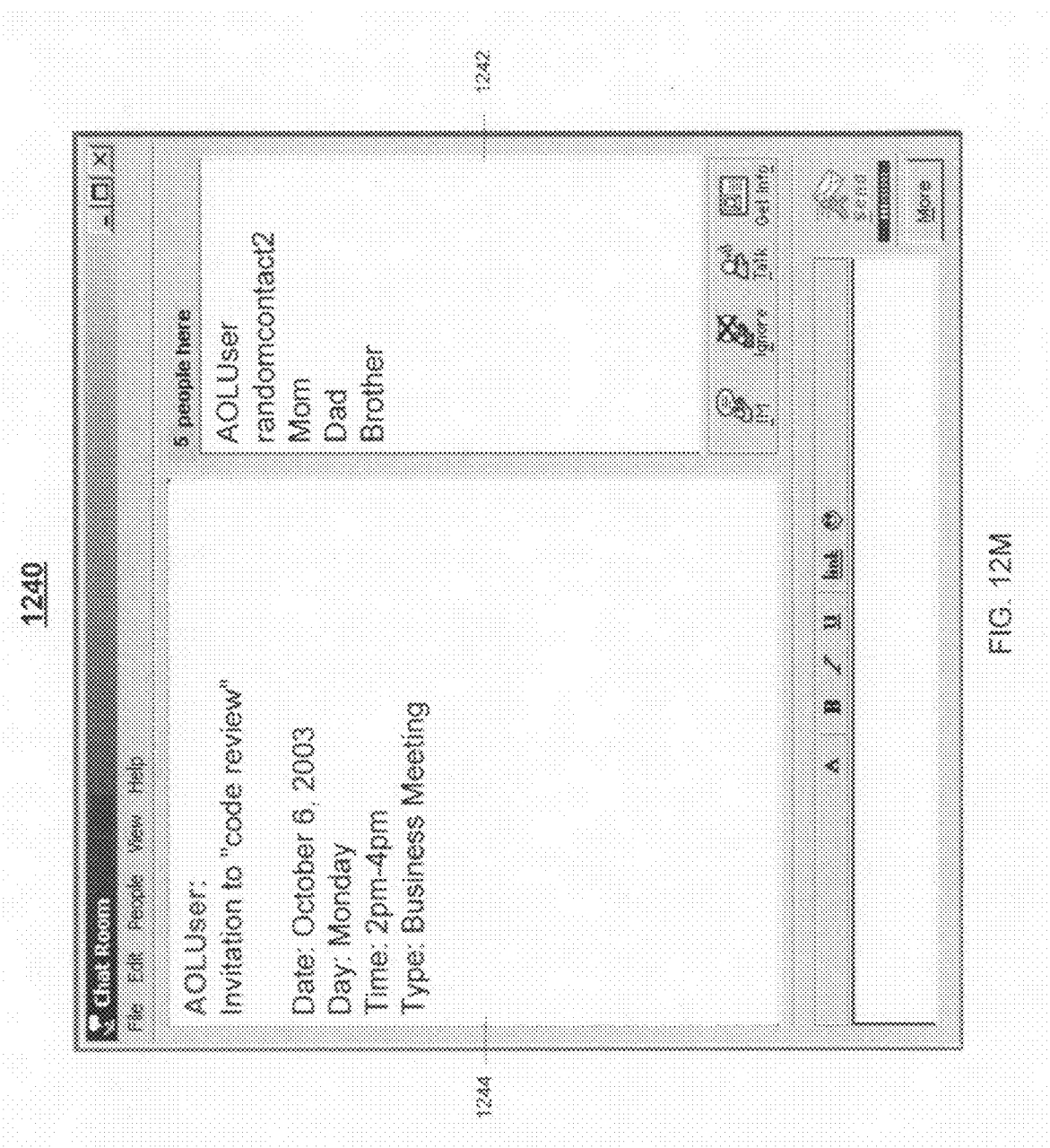

Referring to FIG. 12M, a buddy chat window 1240 enables simultaneous sending of an invitation to the selected event to the selected screen names. The invitor, AOLUser, may be given the option of using multiple instant messages, as was done with respect to FIG. 12L, or a single buddy chat window 1240 to invite the selected screen names to the selected event. A message sent with the buddy chat window 1240 may be seen by all screen names for which the buddy chat window 1240 is displayed. The screen names for which the buddy chat window 1240 are displayed is listed in the screen name list 1244. More particularly, the buddy chat window 1240 is displayed for each of AOLUser, randomcontact2, Mom, Dad, and Brother. The buddy chat window 1240 includes a message history box 1242 in which an invitation to the event is displayed. Each of AOLUser, randomcontact2, Mom, Dad, and Brother may process the invitation in a manner similar to IM 1208. In particular, each of randomcontact2, Mom, Dad, and Brother may make changes to the event as described above with respect to FIG. 12F. However, the proposed changes are received by all invitees to the event, as well as the invitor, with the buddy chat window 1240. Therefore, all of the invitees and the invitor are presented with the changes and may accept the changes or make further changes to the event. When a buddy chat window 1240 is used, the modification process is more collaborative and the burden of receiving and accepting changes does not fall solely on the invitor, AOLUser.

FIGS. 13A-13F illustrate operations that may be experienced in one implementation of the above concepts. The operations include sharing electronic content with multiple users.

Figure 13A:
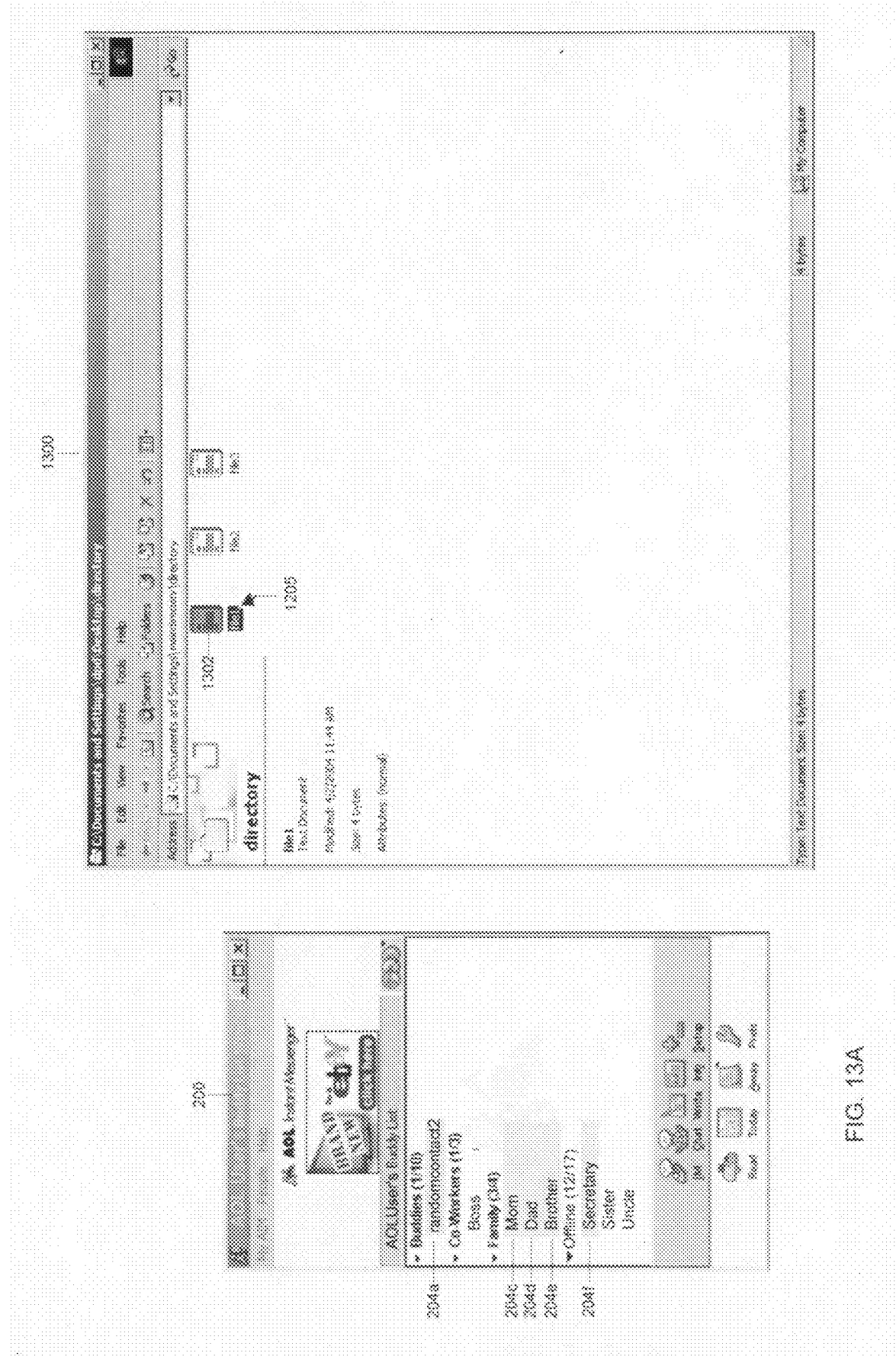
FIGS. 13A-13F are illustrations of exemplary interfaces displayed during sharing of electronic content.

Referring to FIG. 13A, while sharing electronic content, a user with a screen name "AOL User" interacts with the buddy list interface 200. The user also may interact with an interface from which electronic content to be shared may be selected, such as a file system interface 1300. The buddy list interface 200 and the file system interface 1300 may be displayed such that the user sees both the buddy list interface 200 and the file system interface 1300 at the same time. The user may select the file 1302 with the file system interface 1300 as the file to be shared. One or more screen names may be selected in the buddy list interface 200. For example, in the buddy list interface 200, the screen names 204a ("randomcontact2"), 204c ("Mom"), 204d ("Dad"), 204e ("Brother"), and 204f ("Secretary") have been selected. The Mom, Dad, and Brother screen names 204c-204e may be selected individually, or they may be collectively selected by selection of the Family group icon. Users corresponding to the screen names 204a and 204c-204e are online and available to receive instant messages, while a user corresponding to the screen name 204f is not online, as evidenced by location of the screen name 204f within the "Offline" group.

Figure 13B:
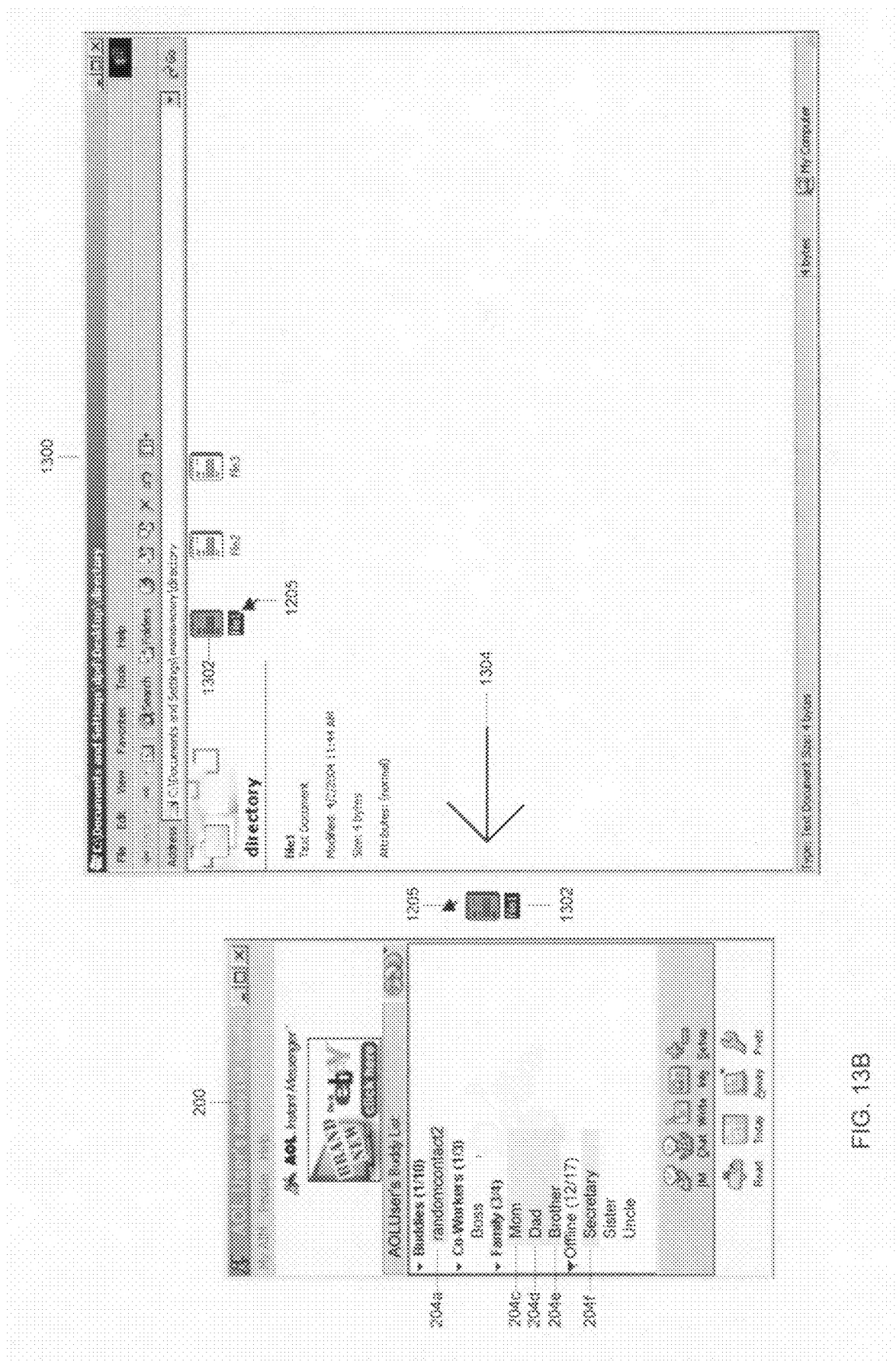
Figure 13C:
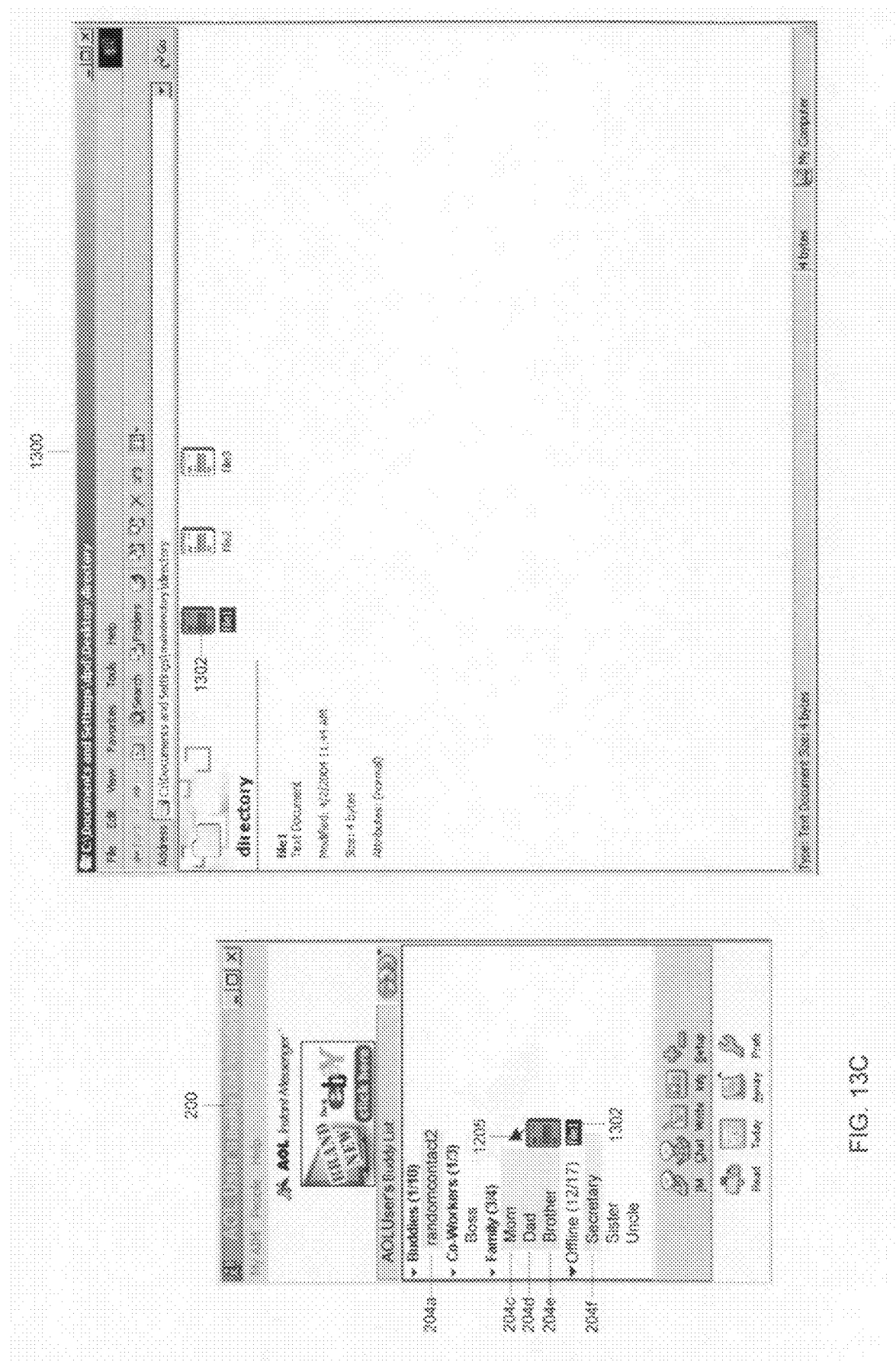

Referring to FIG. 13B, the user may then drag the file 1302 towards the buddy list interface 200, where the screen names 204a and 204c-204f are selected, as indicated by an arrow 1304. Referring to FIG. 13C, the file 1302 has been dragged from the file system interface 1300 over one of the screen names 204a and 204c-204f in the buddy list interface 200, which have been previously selected as recipients of the file 1302.

Figure 13D:
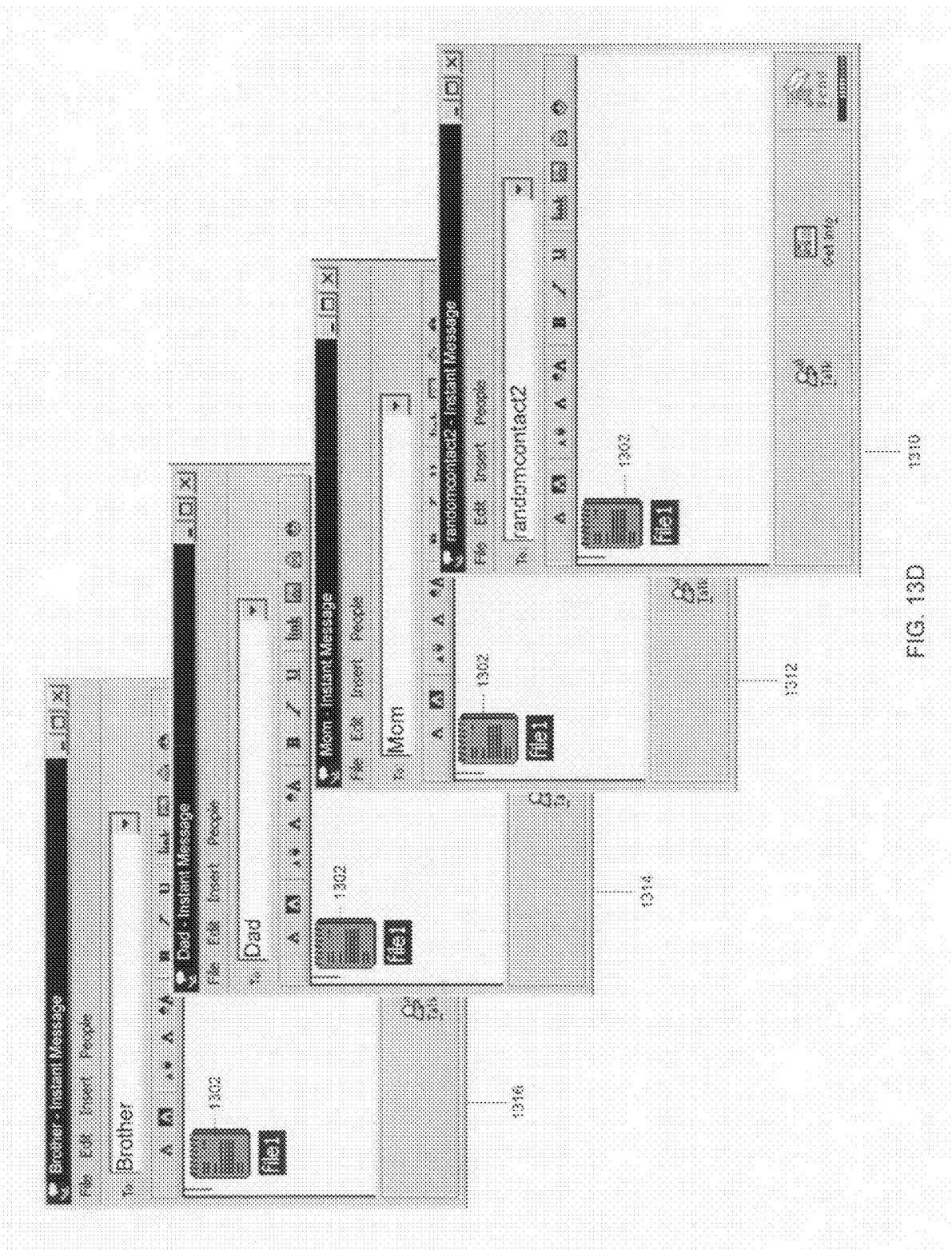

Referring to FIG. 13D, separate IMs 1310 1312, 1314, and 1316 are shown for each of randomcontact2, Mom, Dad, and Brother, respectively. An IM is not generated for Secretary because the user corresponding to Secretary is not available to receive instant messages, as evidenced by the listing of Secretary in the Offline buddy group. Each of IMs 1310 1312, 1314, and 1316 includes an indication of the file 1302 that is to be shared. The user may then send the instant messages 1310 1312, 1314, and 1316 to share the file 1302. In another implementation, the instant messages 1310 1312, 1314, and 1316 may not be shown, and the instant messages sharing the file 1302 with randomcontact2, Mom, Dad, and Brother may be sent automatically and transparently after the file 1302 has been dropped on the screen names 204*a* and 204*c*-204*e*. AOL User also may drag and drop the file 1302 into a buddy group name, such as, for example, "Family," to share the file 1302 with those users included in the corresponding buddy group.

Figure 13E:
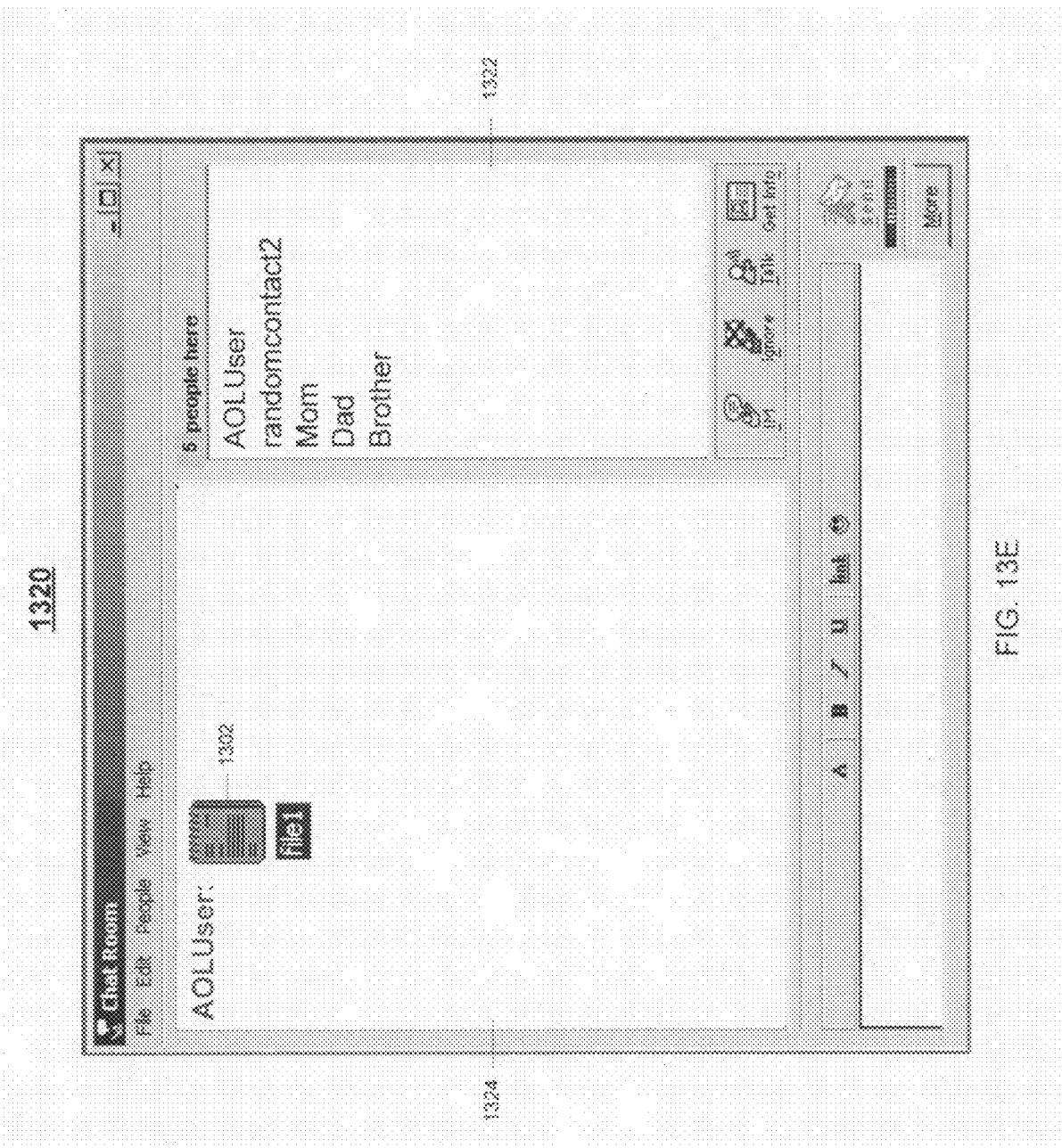

Referring to FIG. 13E, a buddy chat window 1320 enables simultaneous sending of the selected file 1302 to the selected screen names that are online. The user, AOLUser, may be given the option of using multiple instant messages, as was done with respect to FIG. 13D, or a single buddy chat window 1320 to share the file 1302 with the selected screen names. A message sent with the buddy chat window 1320 may be seen by all screen names for which the buddy chat window 1320 is displayed. The screen names for which the buddy chat window 1320 is displayed are listed in the screen name list 1322. More particularly, the buddy chat window 1320 is displayed for each of AOLUser, randomcontact2, Mom, Dad, and Brother. The buddy chat window 1320 is not displayed for Secretary, because Secretary is not available to receive instant messages. The buddy chat window 1320 includes a message history box 1324 in which the file 1302 is displayed to indicate that the file 1302 has been sent to all of the screen names in the screen name list 1322.

Figure 13F:
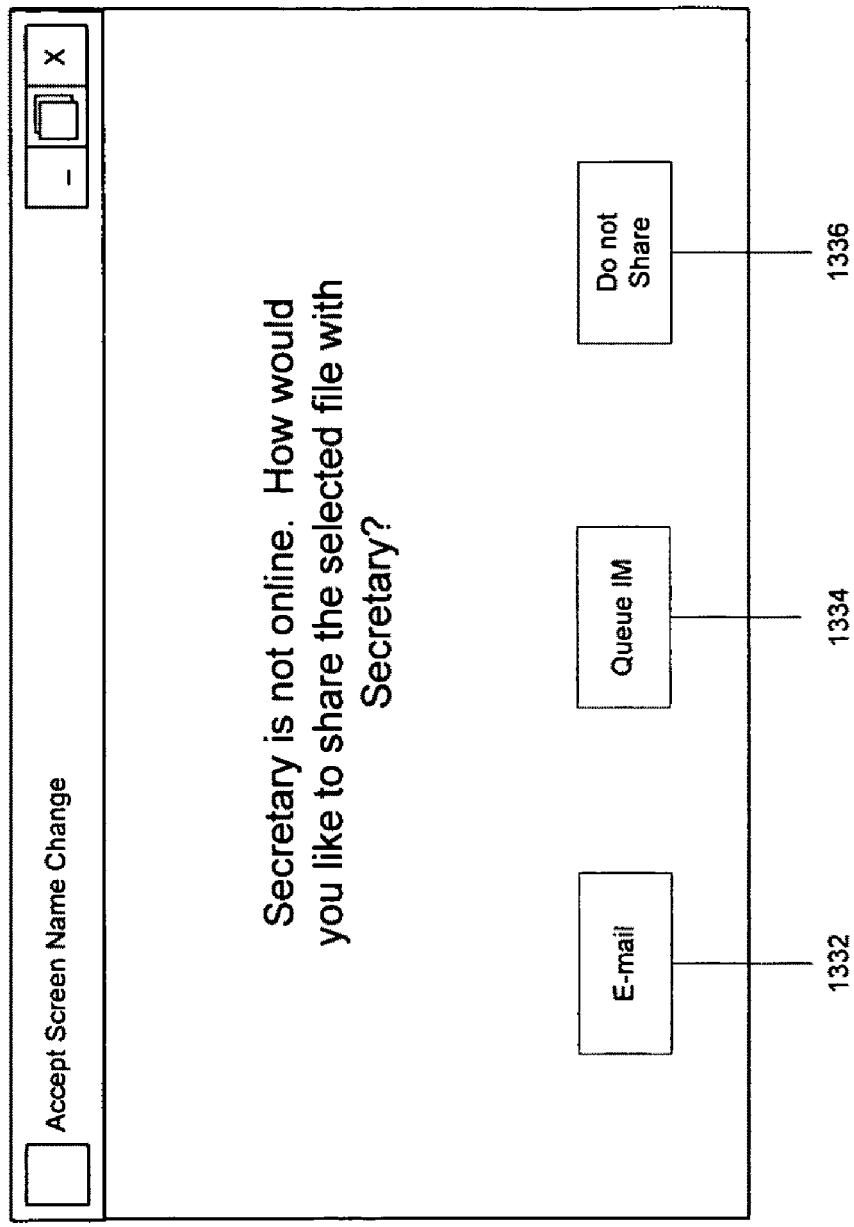

Referring to FIG. 13F, the user may select an alternate mechanism for sharing the file 1302 with the user corresponding to the screen name 204*f* with an interface 1330. The alternate mechanism is selected because the user corresponding to the screen name 204*f* is not available to receive the file in an instant message. The interface 1330 includes an e-mail button 1332 that enables the user to specify that the file 1302 should be sent to Secretary in an e-mail message. The interface 1330 also include an queue button 1334 that enables the user to send the file to Secretary in an instant message that is queued for delivery the next time Secretary may receive instant messages. The interface 1330 also includes a cancel button 1336 with which the user may indicate that the file is no longer to be shared with Secretary.

In some implementations of the above concepts, presence information describing the online or physical presence of users with which electronic content is to be shared may be used to determine how the electronic content is delivered to the users. For example, each of the users may have a cascaded delivery rule that may be resolved to identify an appropriate delivery mechanism based on the presence of the user. For example, a delivery rule for a recipient of shared content may indicate that when the recipient is online, instant messages should be used to share electronic content with the recipient and that when the recipient is not online, e-mail should be used to share electronic content with the recipient. More complicated rules may consider the physical location of the recipient when identifying an appropriate delivery mechanism for the recipient. In addition, the delivery rule may consider more than two delivery mechanisms when identifying the delivery mechanism to be used. If a sender of the content does not have access to a delivery rule for the recipient, then the recipient user may specify a delivery rule for the recipient.

A number of implementations have been described. Nevertheless, it will be understood that various modifications may be made without departing from the spirit and scope of the invention. For example, referring again to FIG. 1, each of the client systems 110 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The client systems 110 may receive instructions from, for example, a software application, a program, a piece of code, a device, a computer, a computer system, or a combination thereof, which independently or collectively direct operations, as described herein. These instructions may take the form of one or more communications programs that facilitate communications between the users of the client systems 110. For instance, such communications programs may include e-mail programs, IM programs, file transfer protocol (FTP) programs, and voice over internet protocol (VoIP) programs. The instructions may be embodied permanently or temporarily in a machine, a component, a piece of equipment, a storage medium, or a propagated signal that is capable of being delivered to the client systems 110.

The client systems 110 include a communications interface (not shown) used by the communications programs to send communications through the network 120. The communications may include, for example, e-mail, audio data, video data, general binary data, or text data (e.g., encoded in American Standard Code for Information Interchange (ASCII) format). The client systems 110 also include one or more input devices, such as a keyboard, mouse, stylus, or microphone, as well as one or more output devices, such as a monitor, touch screen, speakers, or a printer.

The network 120 typically includes a series of portals interconnected through a coherent system. Examples of the network 120 include the Internet, Wide Area Networks (WANs), Local Area Networks (LANs), analog or digital wired and wireless telephone networks (e.g. a Public Switched Telephone Network (PSTN)), an Integrated Services Digital Network (ISDN), or a Digital Subscriber Line (xDSL)), or any other wired or wireless network. The network 120 may include multiple networks or subnetworks, each of which may include, for example, a wired or wireless data pathway.

As with the client systems 110, the host server 130 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The host server 130 may receive instructions from, for example, a software application, a program, a piece of code, a device, a computer, a computer system, or a combination thereof, which independently or collectively direct operations, as described herein. These instructions may take the form of one or more communications programs. For instance, such communications programs may include e-mail programs, IM programs, FTP programs, VoIP programs, etc. The instructions may be embodied permanently or temporarily in a machine, a component, a piece of equipment, a storage medium, or a propagated signal that is capable of being delivered to the host server 130.

Further, the host server 130 includes a communications interface (not shown) used by the communications programs to send communications through the network 120. The communications may include, for example, e-mail, audio data, video data, general binary data, or text data (e.g., ASCII format).

Other implementations allow a user to create a calendar event with selected entities as invitees by a feature that is associated with, for example, IM screen names. For example, a user may right-click on a screen name to provide access to a "create event" feature that creates and opens a calendar event with the screen name inserted as an invitee. Further, multiple screen names may be selected using, for example, <shift> click or <control> click, and a right-click on the selected set may provide access to a "create event" feature that creates and opens a calendar event with each of the selected screen names inserted as invitees.

Throughout the description, a buddy list of an IM system is used to indicate a contact list that includes potential invitees to calendar events. In various implementations, invitees to a calendar event are selected from the buddy list, and instant messages are used to send invitations to the calendar event to the invitees. However, other contact lists may include potential invitees to calendar events, and the other contact lists may be used to send invitations to the invitees. For example, an e-mail address book may be used to select potential invitees, and e-mail messages may be used to send invitations to the invitees. In addition, a list of participants within a chat room/application may be used to select potential invitees, and chat may be used to distribute the invitations. The potential invitees included in the other contact lists may be organized into groups that may be manipulated in a manner such as described above with respect to groups of a buddy list.

The functional blocks, operations, and other disclosed features may be combined and performed in different orders and combinations, and may be repeated, omitted, and/or augmented with other features not explicitly disclosed.

Various implementations perform, for example, one or more operations, functions, or features automatically. "Automatically" refers to being performed substantially without human intervention, that is, in a substantially non-interactive manner. An example of an automatic process is a process that is started in response to a triggering event or in response to some action by a human operator which thereafter runs by itself.

Accordingly, other implementations are within the scope of the following claims.

What is claimed is:

1. A computer-implemented method for sharing an electronic file, the method comprising:
   enabling access to a contacts list user interface that makes perceivable identities and online presence information for at least some of those identities;
   receiving, from a user, an indication of an electronic file that is to be shared with other identities;
   enabling the user to manipulate the contacts list interface to designate at least two identities that appear in the contacts list as identities with whom an electronic file is to be shared;
   in response to receiving the indication of the file that is to be shared and the designation of the at least two identities as identities with whom an electronic file is to be shared:
      automatically generating separate electronic communications to each of the at least two identities designated by the user, wherein each of the separate electronic communications is configured to enable the identity for whom it is intended to reply to the user but not the other of the at least two identities designated by the user, and
      including, within each of the automatically-generated electronic communications, the file that is to be shared;
   determining which of the at least two designated identities presently are online;
   sending the separate, automatically-generated electronic communications, including the file that is to be shared, to the designated identities determined to be presently online using an instant messaging communications program; and
   sending the separate, automatically-generated electronic communications, including the file that is to be shared, to the designated identities determined not to be presently online using one or more communications programs other than the instant messaging communications program.

2. The method of claim 1 further comprising:
   receiving, from a responsive one of the at least two identities designated by the user, an electronic communication that is responsive to the separate, automatically-generated electronic communication that included the file to be shared and that was sent to the responsive identity; and
   restricting the other of the at least two identities designated by the user from accessing the responsive electronic communication.

3. The method of claim 1 wherein enabling the user to manipulate the contacts list interface to designate at least two identities that appear in the contacts list as identities with whom an electronic file is to be shared includes receiving an indication that the user selected the at least two identities as identities with whom an electronic file is to be shared using a pointing device.

4. The method of claim 3 wherein receiving an indication that the user selected the at least two identities as identities with whom an electronic file is to be shared using a pointing device includes receiving an indication that the user individually selected each of the at least two identities using the pointing device.

5. The method of claim 1 wherein:
   receiving, from the user, an indication of an electronic file that is to be shared with other identities includes receiving an indication of a calendar event that is to be shared with other identities;
   including, within, each of the automatically-generated electronic communications, the file that is to be shared includes including, within each of the automatically-generated electronic communications, the calendar event or a corresponding invitation;
   sending the separate, automatically-generated electronic communications, including the file that is to be shared, to the designated identities determined to be presently online using an instant messaging communications program includes sending the separate, automatically-generated electronic communications, including the calendar event or the corresponding invitation, to the designated identities determined to be presently online using the instant messaging program; and
   sending the separate, automatically-generated electronic communications, including the file that is to be shared, to the designated identities determined not to be presently online using the one or more communications program other than the instant messaging communications program includes sending the separate, automatically-generated electronic communications, including the calendar event or the corresponding invitation, to the designated identities determined not to be presently online using one or more communications programs other than the instant messaging communications program.

6. The method of claim 1 wherein receiving, from a user, an indication of an electronic file that is to be shared with other identities includes receiving an indication that the user has dragged and dropped a visual representation of the electronic file to be shared over one or more of the at least two identities designated by the user as identities with whom the electronic file is to be shared.

7. The method of claim 6 wherein receiving an indication that the user has dragged and dropped a visual representation of the electronic file to be shared over one or more of the at least two identities designated by the user as identities with whom the electronic file is to be shared includes receiving an indication that the user has dragged and dropped an icon corresponding to the electronic file to be shared over one or more of the at least two identities designated by the user as identities with whom the electronic file is to be shared.

8. The method of claim 1 wherein enabling the user to manipulate the contacts list interface to designate at least two identities that appear in the contacts list as identities with whom an electronic file is to be shared includes receiving an indication that the user has dragged and dropped the at least two identities that appear in the contacts list over a visual representation of the file that is to be shared.

9. The method of claim 8 wherein receiving an indication that the user has dragged and dropped the at least two identities that appear in the contacts list over a visual representation of the file that is to be shared includes receiving an indication that the user has dragged and dropped visual representations of the at least two identities over an icon corresponding to the file that is to be shared.

10. The method of claim 1 wherein sending the separate, automatically-generated electronic communications, including the file that is to be shared, to the designated identities determined not to be presently online using one or more communications programs other than the instant messaging communications program includes sending the separate, automatically-generated electronic communications, including the file that is to be shared, to the designated identities determined not to be presently online using an electronic mail program.

11. The method of claim 1 wherein sending the separate, automatically-generated electronic communications, including the file that is to be shared, to the designated identities determined not to be presently online using one or more communications programs other than the instant messaging communications program includes:
  enabling the user to specify one or more communications programs other than the instant messaging communications program to use to send the separate, automatically-generated electronic communications, including the file that is to be shared, to the designated identities determined not to be presently online; and
  using the one or more communications programs specified by the user to send the separate, automatically-generated electronic communications, including the file that is to be shared, to the designated identities determined not to be presently online.

12. The method of claim 1 wherein receiving, from the user, the indication of the electronic file that is to be shared with other identities occurs before enabling the user to manipulate the contacts list interface to designate at least two identities that appear in the contacts list as identities with whom the electronic file is to be shared.

13. The method of claim 1 wherein enabling the user to manipulate the contacts list interface to designate at least two identities that appear in the contacts list as identities with whom an electronic file is to be shared occurs before receiving, from the user, the indication of the electronic file that is to be shared.

14. The method of claim 1 wherein:
sending the separate, automatically-generated electronic communications, including the file that is to be shared, to the designated identities determined to be presently online using an instant messaging communications program includes automatically sending the separate, automatically-generated electronic communications, including the file that is to be shared, to the designated identities determined to be presently online using the instant messaging communications program without further interaction from the user; and
sending the separate, automatically generated electronic communications, including the file that is to be shared, to the designated identities determined not to be presently online using the one or more communications programs other than the instant messaging communications program includes automatically sending the separate, automatically-generated electronic communications, including the file that is to be shared, to the designated identities determined not to be presently online using one or more communications programs other than the instant messaging communications program without further interaction from the user.

15. The method of claim 1 wherein:
sending the separate, automatically-generated electronic communications, including the file that is to be shared, to the designated identities determined to be presently online using an instant messaging communications program includes:
  prompting the user to confirm that the separate, automatically-generated electronic communications, including the file that is to be shared, are to be sent to each of the identities determined to be presently online,
  receiving confirmation from the user that the separate, automatically-generated electronic communications, including the file that is to be shared, are to be sent to each of the identities determined to be presently online, and
  sending the separate, automatically-generated electronic communications, including the file that is to be shared, to the identities determined to be presently online using the instant messaging communications program in response to receiving the confirmation from the users; and
sending the separate, automatically-generated electronic communications, including the file that is to be shared, to the designated identities determined not to be presently online using one or more communications programs other that the instant messaging communications program includes:
  prompting the user to confirm that the separate, automatically-generated electronic communications, including the file that is to be shared, are to be sent to each of the identities determined not to be presently online,
  receiving confirmation from the user that the separate, automatically-generated electronic communications, including the file that is to be shared, are to be sent to each of the identities determined not be presently online, and
  sending the separate, automatically-generated electronic communications, including the file that is to be shared, to the identities determined not to be presently online using one or more communications programs other than the instant messaging communications program in response to receiving the confirmation from the user.

16. A computer readable storage medium storing instructions that, when executed, cause a computer to:
  enable access to a contacts list user interface that makes perceivable identities and on-line presence information for at least some of those identities;
  receive, from a user, an indication of an electronic file that is to be shared with other identities;
  enable the user to manipulate the contacts list interface to designate at least two identities that appear ill the contacts list as identities with whom an electronic file is to be shared;
  in response to receiving the indication of the file that is to be shared and the designation of the at least two identities as identities with whom an electronic file is to be shared:
    automatically generate separate electronic communications to each of the at least two identities designated by the user, wherein each of the separate electronic communications is configured to enable the identity for whom it is intended to reply to the user but not the other of the at least two identities designated by the user, and
    include, within each of the automatically-generated electronic communications, the file that is to be shared;
  determine which of the at least two designated identities presently are online;
  send the separate, automatically-generated electronic communications, including the file that is to be shared, to the designated identities determined to be presently online using an instant messaging communications program; and
  send the separate, automatically-generated electronic communications, including the file that is to be shared, to the designated identities determined no to be presently online using one or more communications programs other that the instant messaging communications program.

17. A computer-implemented method for sharing electronic content, the method comprising:
  displaying, to a user of an instant messaging system, a graphical user interface that includes a list of instant messaging identities, that enables the user to perceive on-line presence information for at least some of the instant messaging identities included within the list of instant messaging identities, and that enables the user to initiate instant messaging sessions with at least some of the instant messaging identities included within the list of instant messaging identities:
  receiving an indication of a selection by the user of content to be shared with one or more instant messaging identities included in the list of instant messaging identities;
  receiving an indication of a selection by the user of multiple of the instant messaging identities from within the list of instant messaging identities; and
  in response to receiving the indication of the selection of content to be shared and the indication of the selection of the multiple instant messaging identities from within the list of instant messaging identities:
    determining which of the selected instant messaging identities are presently available to receive instant messages and which of the selected instant messaging identities are not presently available to receive instant messages,
    for each selected instant messaging identity determined to be presently available to receive instant messages, sending a separate instant message that includes the content to be shared to the selected instant messaging identity, and
    for each selected instant messaging identity determined not to be presently available to receive instant messages:
      determining an alternative delivery mechanism for communicating the content to be shared to the selected instant messaging identity, and
      leveraging the determined alternative delivery mechanism to communicate the content to be shared to the selected instant messaging identity.

18. The method of claim 17 wherein receiving an indication of a selection by the user of content to be shared with one or more instant messaging identities included in the list of instant messaging identities includes receiving an indication that the user dragged and dropped a visual representation of the content to be shared over at least one of the selected identities displayed within the list of instant messaging identities in the graphical user interface.

19. The method of claim 18 wherein receiving an indication that the user dragged and dropped a visual representation of the content to be shared over at least one of the selected identities displayed within the list of instant messaging identities in the graphical user interface includes receiving an indication that the user dragged and dropped an icon corresponding to the content to be shared over at least one of the selected identities displayed within the list of instant messaging identities in the graphical user interface.

20. The method of claim 17 wherein:
  displaying, to the user of the instant messaging system, a graphical user interface that includes a list of instant messaging identities, that enables the user to perceive on-line presence information for at least some of the instant messaging identities included within the list of instant messaging identities, and that enables the user to initiate instant messaging sessions with at least some of the instant messaging identities included within the list of instant messaging identities includes displaying, to the user of the instant messaging system, a graphical user interface that includes a list of instant messaging identities that has at least one identifiable subgroup of a plurality of instant messaging identities, the identifiable subgroup being identified by a label displayed within the graphical user interface; and
  receiving an indication of a selection by the user of content to be shared with one or more instant messaging identities included in the list of instant messaging identities includes receiving an indication that the user dragged and dropped a visual representation of the content to be shared over the label that identifies the subgroup within the graphical user interface.

21. The method of claim 20 wherein receiving an indication that the user dragged and dropped a visual representation of the content to be shared over the label that identifies the subgroup within the graphical user interface includes receiving an indication that the user dragged and dropped an icon corresponding to the content to be shared over the label that identifies the subgroup within the graphical user interface.

22. The method of claim 17 wherein receiving an indication of a selection by the user of multiple of the instant messaging identities from within the list of instant messaging identities includes receiving an indication that the user dragged and dropped multiple instant messaging identities displayed within the list of instant messaging identities in the graphical user interface over a visual representation of the selected content to be shared.

23. The method of claim 22 wherein receiving an indication that the user dragged and dropped multiple instant messaging identities displayed within the list of instant messaging identities in the graphical user interface over a visual representation of the selected content to be shared includes receiving an indication that the user dragged and dropped multiple instant messaging identities displayed within the list of instant messaging identities in the graphical user interface over an icon corresponding to the selected content to be shared.

24. The method of claim 17 wherein:
displaying, to the user of the instant messaging system, a graphical user interface that includes a list of instant messaging identities, that enables the user to perceive on-line presence information for at least some of the instant messaging identities included within the list of instant messaging identities, and that enables the user to initiate instant messaging sessions with at least some of the instant messaging identities included within the list of instant messaging identities includes displaying, to the user of the instant messaging system, a graphical user interface that includes a list of instant messaging identities that has at least one identifiable subgroup of a plurality of instant messaging identities, the identifiable subgroup being identified by a label displayed within the graphical user interface; and
receiving an indication of a selection by the user of multiple of the instant messaging identities from within the list of instant messaging identities includes receiving an indication that the user selected each of the instant messaging identities within the identifiable subgroup of instant messaging identities by dragging and dropping the label that identifies the subgroup within the graphical user interface over a visual representation of the selected content to be shared.

25. The method of claim 24 wherein receiving an indication that the user selected each of the instant messaging identities within the identifiable subgroup of instant messaging identities by dragging and dropping the label that identifies the subgroup within the graphical user interface over a visual representation of the selected content to be shared includes receiving an indication that the user selected each of the instant messaging identities within the identifiable subgroup of instant messaging identities by dragging and dropping the label that identifies the subgroup within the graphical user interface over an icon that corresponds to the selected content to be shared.

26. The method of claim 17 wherein:
determining an alternative delivery mechanism for communicating the content to be shared to a particular one of the selected instant messaging identities determined not to be presently available to receive instant messages includes determining to leverage e-mail to communicate the content to be shared to the particular selected instant messaging identity determined not to be presently available to receive instant messages; and
leveraging the determined alternative delivery mechanism to communicate the content to be shared to the particular selected instant messaging identity determined not to be presently available to receive instant messages includes sending an e-mail that includes the content to be shared to the particular selected instant messaging identity determined not to be presently available to receive instant messages.

27. The method of claim 17 wherein:
determining an alternative delivery mechanism for communicating the content to be shared to a particular one of the selected instant messaging identities determined not to be presently available to receive instant messages includes determining to queue an instant message that includes the content to be shared for subsequent delivery to the particular selected instant messaging identity determined not to be presently available to receive instant messages when the particular selected instant messaging identity determined not to be presently available to receive instant messages becomes available to receive instant messages; and
leveraging the determined alternative delivery mechanism to communicate the content to be shared to the particular selected instant messaging identity determined not to be presently available to receive instant messages includes queuing the instant message that includes the content to be shared for subsequent delivery to the particular selected instant messaging identity determined not to be presently available to receive instant messages when the particular selected instant messaging identity determined not to be presently available to receive instant messages becomes available to receive instant messages.

28. The method of claim 27 wherein leveraging the determined alternative delivery mechanism to communicate the content to be shared to the particular selected instant messaging identity determined not to be presently available to receive instant messages further includes:
determining that the particular selected instant messaging identity previously determined not to be presently available to receive instant messages has become available to receive instant messages; and
in response to determining that the particular selected instant messaging identity previously determined not to be presently available to receive instant messages has become available to receive instant messages, sending the queued instant message that includes the content to be shared to the particular selected instant messaging identity previously determined not to be presently available to receive instant messages.

29. The method of claim 17 wherein:
determining an alternative delivery mechanism for communicating the content to be shared to a particular one of the selected instant messaging identities determined not to be presently available to receive instant messages includes determining not to communicate the content to be shared to the particular one of the selected instant messaging identities determined not to be presently available to receive instant messages; and
leveraging the determined alternative delivery mechanism to communicate the content to be shared to the particular selected instant messaging identity determined not to be presently available to receive instant messages includes canceling communication of the content to be shared to the particular selected instant messaging identity determined not to be presently available to receive instant messages.

30. The method of claim 17 wherein receiving an indication of a selection by the user of content to be shared with one or more instant messaging identities included in the list of instant messaging identities occurs before receiving an indication of a selection by the user of multiple of the instant messaging identities from within the list of instant messaging identities.

31. The method of claim 17 wherein receiving an indication of a selection by the user of content to be shared with one or more instant messaging identities included in the list of instant messaging identities occurs after receiving an indication of a selection by the user of multiple of the instant messaging identities from within the list of instant messaging identities.

32. A computer-implemented method for sharing electronic content, the method comprising:

displaying, to a user of an instant messaging system, a graphical user interface that includes a list of instant messaging identities, that enables the user to perceive on-line presence information for at least some of the instant messaging identities included within the list of instant messaging identities, and that enables the user to initiate instant messaging sessions with at least some of the instant messaging identities included within the list of instant messaging identities;

receiving an indication of a selection by the user of content to be shared with one or more instant messaging identities included in the list of instant messaging identities;

receiving an indication of a selection by the user of multiple of the instant messaging identities from within the list of instant messaging identities; and in response to receiving the indication of the selection of content to be shared and the indication of the selection of the multiple instant messaging identities from within the list of instant messaging identities:

determining which of the selected instant messaging identities are presently available to receive instant messages and which of the selected instant messaging identities are not presently available to receive instant messages, for the selected instant messaging identities determined to be presently available to receive instant messages:

initiating an electronic chat room that includes each of the selected instant messaging identities determined to be presently available to receive instant messages, and making the selected content available in the electronic chat room to each of the selected instant messaging identities, and for each selected instant messaging identity determined not to be presently available to receive instant messages:

determining an alternative delivery mechanism for communicating the content to be shared to the selected instant messaging identity, and leveraging the determined alternative delivery mechanism to communicate the content to be shared to the selected instant messaging identity.

* * * * *